United States Patent
Koshkaroff et al.

(10) Patent No.: US 12,053,041 B2
(45) Date of Patent: *Aug. 6, 2024

(54) APPAREL WITH DYNAMIC VENT STRUCTURE

(71) Applicant: Nike, Inc., Beaverton, OR (US)

(72) Inventors: Iustinia Koshkaroff, Portland, OR (US); Daniel P. Morgan, Beaverton, OR (US); Kyle Schepke, Portland, OR (US); Joshua Patrick Williams, Portland, OR (US); Nina Yashkova, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,362

(22) Filed: Jan. 23, 2023

(65) Prior Publication Data
US 2023/0157392 A1    May 25, 2023

Related U.S. Application Data

(63) Continuation of application No. 16/988,093, filed on Aug. 7, 2020, now Pat. No. 11,559,092.
(Continued)

(51) Int. Cl.
*B32B 5/26* (2006.01)
*A41D 13/015* (2006.01)
(Continued)

(52) U.S. Cl.
CPC ......... *A41D 27/28* (2013.01); *A41D 13/0156* (2013.01); *A41D 31/02* (2013.01);
(Continued)

(58) Field of Classification Search
CPC .. B32B 7/05; B32B 3/085; B32B 5/26; B32B 37/0076; B32B 2274/00; B32B 2305/18;
(Continued)

(56) References Cited

U.S. PATENT DOCUMENTS 2,655,693 A    10/1953    Adams
3,300,557 A     1/1967    Luciano
(Continued)

FOREIGN PATENT DOCUMENTS

CN    2521924 Y    11/2002
CN    102613730 A    8/2012
(Continued)

OTHER PUBLICATIONS

Final Office Action received for U.S. Appl. No. 16/988,110, mailed on Feb. 17, 2023, 17 pages.
(Continued)

*Primary Examiner* — Matthew D Matzek
(74) *Attorney, Agent, or Firm* — Shook, Hardy & Bacon L.L.P.

(57) ABSTRACT

Aspects herein are directed to an article of apparel having a vent opening formed by overlapping the edges of a first panel and a second panel. A plurality of discrete overlay film structures are applied to the second panel adjacent to the vent opening. When the article of apparel is exposed to an external stimulus, the film structures undergo a reversible increase in dimension in at least the z-direction which cause the second panel of material to undergo a reversible decrease in dimension in the direction of a longitudinal axis of the vent opening thereby causing the vent opening to dynamically transition from a closed state to an open state.

18 Claims, 16 Drawing Sheets

Related U.S. Application Data

(60) Provisional application No. 62/972,426, filed on Feb. 10, 2020, provisional application No. 62/951,154, filed on Dec. 20, 2019, provisional application No. 62/924,527, filed on Oct. 22, 2019, provisional application No. 62/885,589, filed on Aug. 12, 2019.

(51) Int. Cl.

| | | |
|---|---|---|
| *A41D 27/28* | (2006.01) | |
| *A41D 31/02* | (2019.01) | |
| *A41D 31/12* | (2019.01) | |
| *A41D 31/18* | (2019.01) | |
| *B05C 5/02* | (2006.01) | |
| *B05C 11/00* | (2006.01) | |
| *B05D 1/26* | (2006.01) | |
| *B05D 1/28* | (2006.01) | |
| *B05D 7/14* | (2006.01) | |
| *B32B 3/08* | (2006.01) | |
| *B32B 7/05* | (2019.01) | |
| *B32B 37/00* | (2006.01) | |
| *D06B 1/02* | (2006.01) | |
| *B32B 3/26* | (2006.01) | |

(52) U.S. Cl.
CPC ......... *A41D 31/125* (2019.02); *A41D 31/185* (2019.02); *B05C 5/0208* (2013.01); *B05C 11/00* (2013.01); *B05D 1/265* (2013.01); *B05D 1/286* (2013.01); *B05D 7/14* (2013.01); *B32B 3/085* (2013.01); *B32B 5/26* (2013.01); *B32B 7/05* (2019.01); *B32B 37/0076* (2013.01); *D06B 1/02* (2013.01); *B32B 3/266* (2013.01); *B32B 2274/00* (2013.01); *B32B 2305/18* (2013.01); *B32B 2307/728* (2013.01); *B32B 2307/734* (2013.01); *Y10T 442/162* (2015.04); *Y10T 442/3854* (2015.04); *Y10T 442/40* (2015.04)

(58) Field of Classification Search
CPC ........ B32B 2307/728; B32B 2307/734; A41D 27/28; A41D 31/02; A41D 31/125; A41D 31/185
USPC ........... 2/69, 85, 90, 102, 113, 115; 428/190
See application file for complete search history.

(56) References Cited

U.S. PATENT DOCUMENTS

| | | | |
|---|---|---|---|
| 3,417,175 A | 12/1968 | Brown et al. | |
| 3,439,083 A | 4/1969 | Ugolini | |
| 3,791,906 A | 2/1974 | Farkas | |
| 4,415,623 A | 11/1983 | Schlaepfer | |
| 4,880,588 A | 11/1989 | Brault et al. | |
| 5,498,307 A | 3/1996 | Stevenson | |
| 5,937,272 A | 8/1999 | Tang | |
| 6,194,119 B1 | 2/2001 | Wolk et al. | |
| 6,296,732 B1 | 10/2001 | Enlow et al. | |
| 6,733,870 B2 | 5/2004 | Enlow et al. | |
| 6,767,807 B2 | 7/2004 | Shibata et al. | |
| 6,773,537 B2 | 8/2004 | Erickson et al. | |
| 6,809,045 B1 | 10/2004 | Alam et al. | |
| 8,039,373 B2 | 10/2011 | Fujinawa et al. | |
| 8,574,668 B2 | 11/2013 | Brown et al. | |
| 8,956,685 B2 | 2/2015 | Bogue et al. | |
| 9,732,454 B2 | 8/2017 | Davis et al. | |
| 10,170,341 B1 | 1/2019 | Lin et al. | |
| 2005/0252602 A1 | 11/2005 | Tateishi | |
| 2006/0260024 A1 | 11/2006 | Lee | |
| 2007/0016999 A1 | 1/2007 | Harber et al. | |
| 2007/0026265 A1 | 2/2007 | Sakurai et al. | |
| 2007/0042660 A1 | 2/2007 | Waxler | |
| 2007/0161305 A1 | 7/2007 | Wangbunyen | |
| 2007/0270067 A1 | 11/2007 | Yasui et al. | |
| 2007/0293106 A1 | 12/2007 | Harber | |
| 2008/0057809 A1 | 3/2008 | Rock | |
| 2008/0075850 A1 | 3/2008 | Rock | |
| 2008/0104738 A1 | 5/2008 | Conley et al. | |
| 2008/0254263 A1 | 10/2008 | Yasui et al. | |
| 2009/0276936 A1* | 11/2009 | Makida | D06M 15/53 428/196 |
| 2011/0296580 A1* | 12/2011 | Demarest | A41D 27/28 2/243.1 |
| 2012/0282403 A1 | 11/2012 | Ray et al. | |
| 2014/0000004 A1 | 1/2014 | Baron et al. | |
| 2014/0082815 A1 | 3/2014 | Harber et al. | |
| 2016/0338415 A1 | 11/2016 | Aihara | |
| 2016/0338435 A1 | 11/2016 | Aihara | |
| 2016/0340826 A1 | 11/2016 | Tibbits et al. | |
| 2017/0071275 A1 | 3/2017 | Darby | |
| 2017/0105466 A1* | 4/2017 | Baschak | A41D 27/28 |
| 2017/0144344 A1 | 5/2017 | Schmidt et al. | |
| 2017/0273377 A1 | 9/2017 | Aihara et al. | |
| 2017/0340037 A1 | 11/2017 | Bailey et al. | |
| 2018/0049698 A1 | 2/2018 | Berg et al. | |
| 2018/0142389 A1 | 5/2018 | Diaz et al. | |
| 2018/0192720 A1 | 7/2018 | Blackford et al. | |
| 2018/0194106 A1* | 7/2018 | Tibbits | B32B 3/266 |
| 2018/0195213 A1* | 7/2018 | Tibbits | D03D 15/567 |
| 2018/0195216 A1 | 7/2018 | Lin | |
| 2020/0131695 A1* | 4/2020 | Lao | D06M 23/16 |
| 2020/0215786 A1 | 7/2020 | Dorton et al. | |
| 2021/0045474 A1 | 2/2021 | Koshkaroff et al. | |
| 2021/0045476 A1 | 2/2021 | Morgan et al. | |
| 2021/0045477 A1 | 2/2021 | Morgan et al. | |
| 2022/0030992 A1 | 2/2022 | Koshkaroff et al. | |
| 2022/0347717 A1 | 11/2022 | Janes et al. | |

FOREIGN PATENT DOCUMENTS

| | | |
|---|---|---|
| CN | 103519427 A | 1/2014 |
| CN | 104859270 A | 8/2015 |
| CN | 107750130 A | 3/2018 |
| CN | 108471823 A | 8/2018 |
| EP | 0360929 A1 | 4/1990 |
| EP | 0789543 B1 | 6/2002 |
| EP | 2411210 B1 | 7/2016 |
| EP | 3449743 A1 | 3/2019 |
| FR | 2856708 A1 | 12/2004 |
| GB | 2184399 B | 2/1990 |
| JP | 2000-195665 A | 7/2000 |
| JP | 2002-338908 A | 11/2002 |
| JP | 2003-322715 A | 11/2003 |
| KR | 10-2009-0102426 A | 9/2009 |
| WO | 2009/041916 A1 | 4/2009 |
| WO | 2019/155348 A1 | 8/2019 |
| WO | 2019/169079 A1 | 9/2019 |
| WO | 2021/027837 A1 | 2/2021 |
| WO | 2021/096724 A1 | 5/2021 |

OTHER PUBLICATIONS

Final Office Action received for U.S. Appl. No. 16/988,116, mailed on Jan. 19, 2023, 9 pages.
International Search Report and Written Opinion received for PCT Patent Application No. PCT/US2022/046742, mailed on Jan. 26, 2023, 13 pages.
Bixby adds third dimension to plastic sheet extrusions, Plastics, Available online at: <https://www.plastics.gl/extrusion-film/bixby-adds-third-dimension-to-plastic-sheet-extrusions/#:~:text=The% 20company%20Bixby%20International%20has,profiles%20in% 20their%20extruded%20sheet.>, 2019, 2 pages.
Production Processes, 8 pages.
Hardy, Norm, "What is Patterned Thin Film Deposition For Lift Off?", Semicore, Available online at: <http://www.semicore.com/news/73-thin-film-deposition-lift-off>, Sep. 16, 2013, 2 pages.
Yang, Lei, "Patterning Technique", ScienceDirect, Available online at: <https://www.sciencedirect.com/topics/engineering/patterning-method>, 2015, 22 pages.

(56) References Cited

OTHER PUBLICATIONS

Extended European Search Report received for European Patent Application No. 20852126.0, mailed on Sep. 8, 2023, 9 pages.
Final Office Action received for U.S. Appl. No. 16/988,110, mailed on Sep. 21, 2023, 16 pages.
Non-Final Office Action received for U.S. Appl. No. 16/988,116, mailed on Sep. 27, 2023, 9 pages.
Non-Final Office Action received for U.S. Appl. No. 16/988,110, mailed on Jun. 7, 2023, 19 pages.
Intention to Grant received for European Application No. 20761444.7, mailed on Dec. 15, 2023, 6 pages.
Office Action received for European Application No. 20761445.4, mailed on Dec. 14, 2023, 6 pages.
Office Action received for European Application No. 20761936.2, mailed on Dec. 13, 2023, 4 pages.
Non-Final Office Action received for U.S. Appl. No. 17/505,198, mailed on Apr. 22, 2024, 18 pages.

* cited by examiner

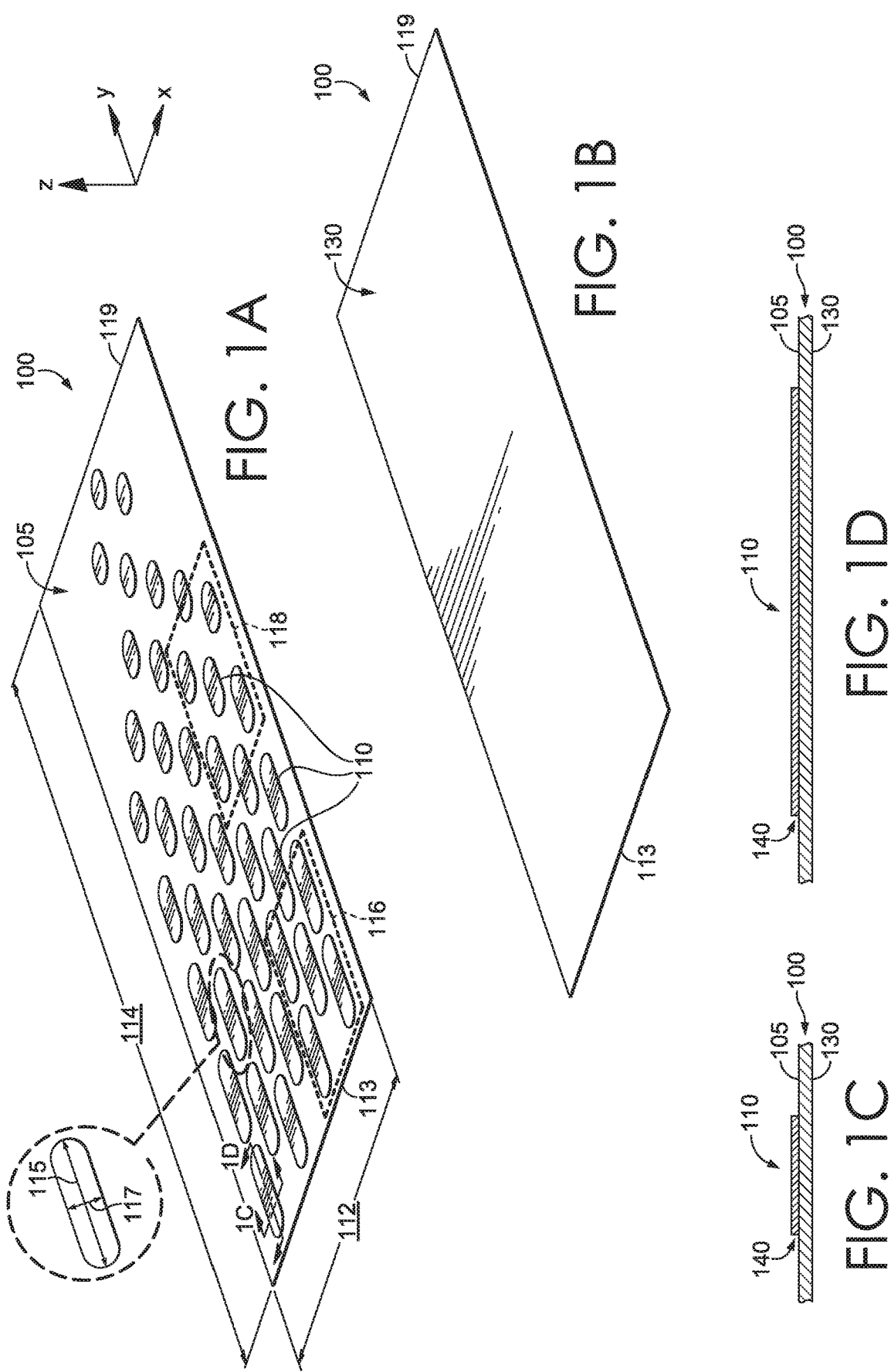

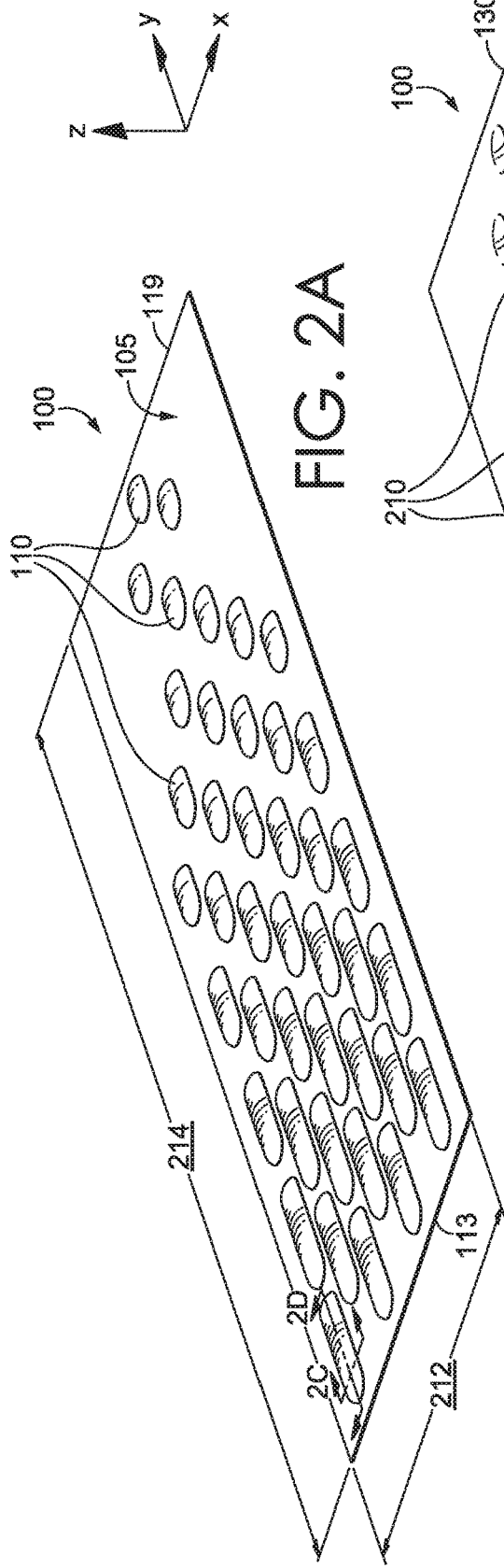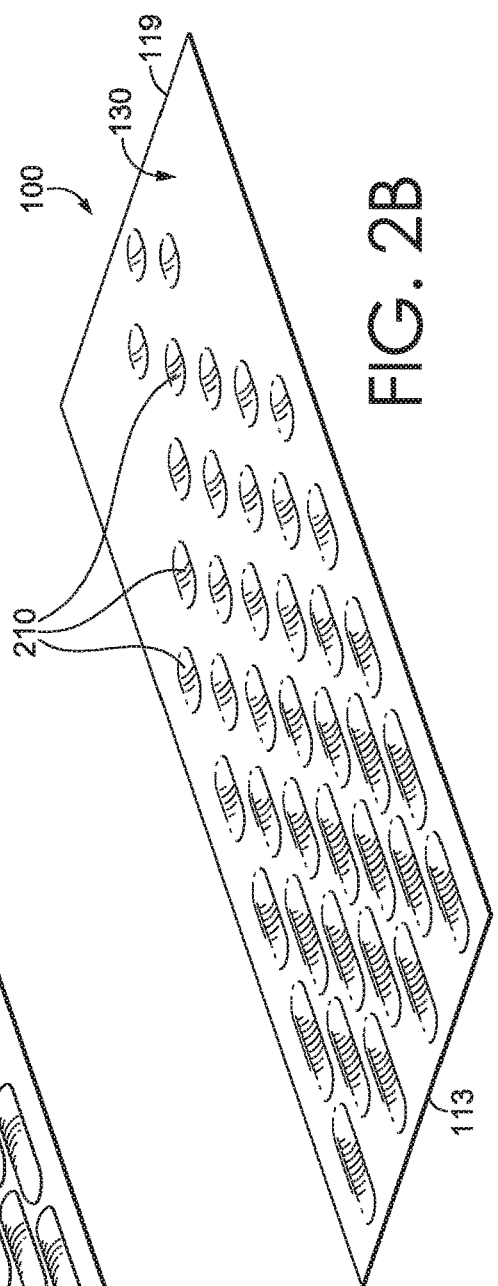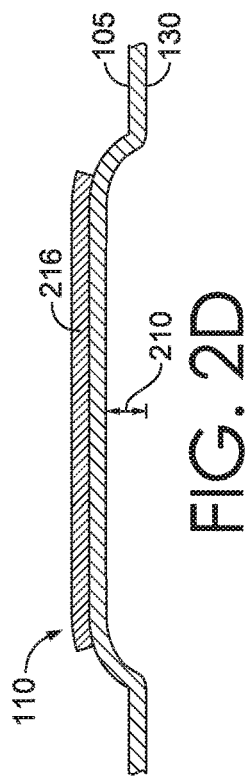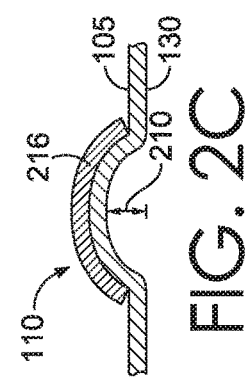

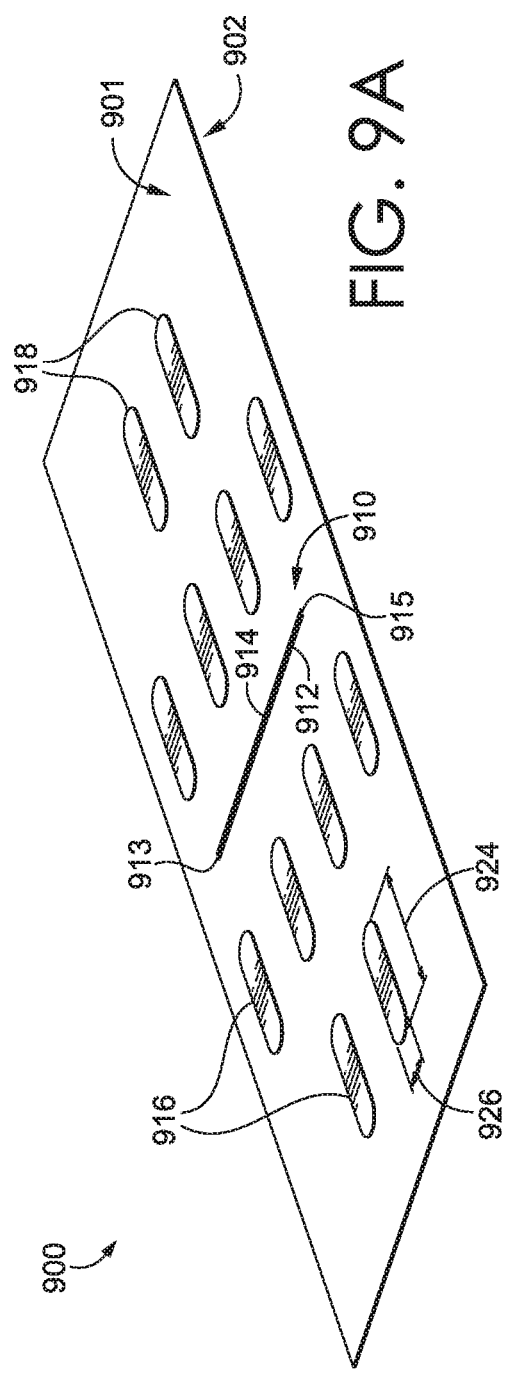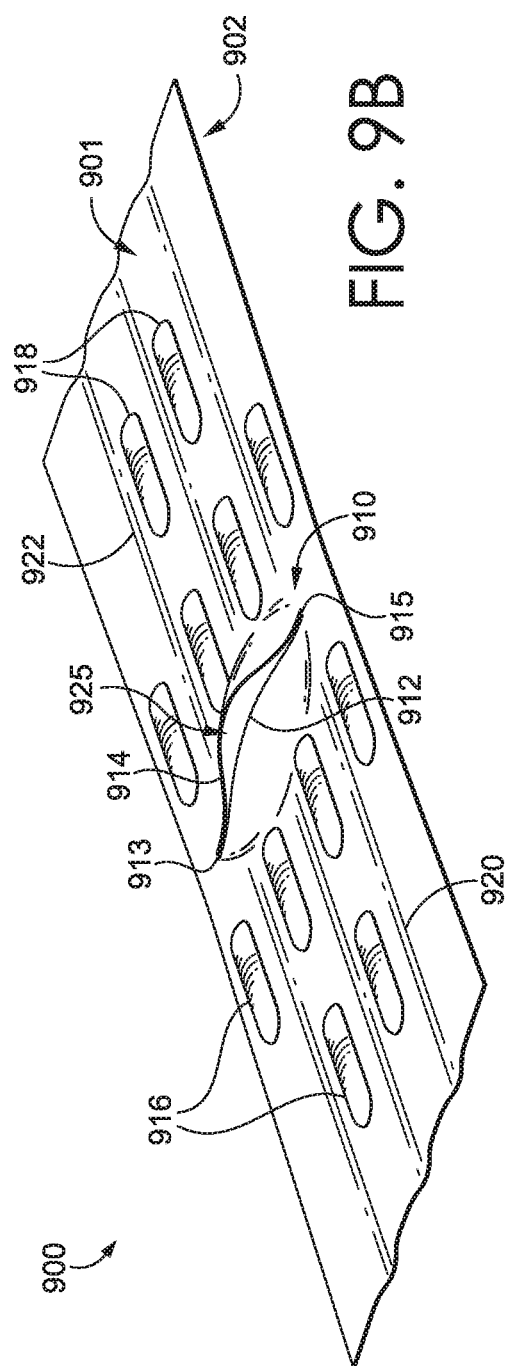

APPAREL WITH DYNAMIC VENT STRUCTURE

CROSS-REFERENCE TO RELATED APPLICATIONS

This application, entitled "Apparel with Dynamic Vent Structure," is a continuation of U.S. application Ser. No. 16/988,093, filed Aug. 7, 2020, and entitled "Apparel with Dynamic Vent Structure," which claims the benefit of priority of U.S. Provisional App. No. 62/924,527, filed Oct. 22, 2019, and entitled "Apparel with Dynamic Vent Structure," U.S. Provisional App. No. 62/885,589, filed Aug. 12, 2019, and entitled "Apparel with Adaptive Fit," U.S. Provisional App. No. 62/951,154, filed Dec. 20, 2019, and entitled "Methods, Systems, and Articles for Producing a Film Pattern on a Substrate Material," and U.S. Provisional App. No. 62/972,426, filed Feb. 10, 2020, and entitled "Apparel with Cling Reduction Features." The entireties of the aforementioned applications are incorporated by reference herein.

TECHNICAL FIELD

Aspects herein are directed to an article of apparel that utilizes discrete overlay film structures that are responsive to an external stimulus to dynamically transition one or more vent openings from a closed state to an open state.

BACKGROUND

Vent structures on traditional articles of apparel generally open and close through use of a mechanical structure that requires human manipulation such as a zipper or fastener, passively open and close in response to air flowing in or out of the vent structure, or exist in a static state such as always open.

SUMMARY

The following clauses represent example aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are examples and are not limiting.

Clause 1. An article of apparel comprising: a first panel having a first panel edge; a second panel having a second panel edge, wherein the first panel edge is discontinuously affixed to the second panel edge to form a vent opening having a longitudinal axis; and a plurality of discrete overlay film structures affixed to the second panel, each of the plurality of discrete overlay film structures having a long axis and a short axis, wherein the long axis of the each of the plurality of discrete overlay film structures is oriented substantially perpendicular to the longitudinal axis of the vent opening, and wherein upon exposure to moisture the plurality of discrete overlay film structures undergo an increase in dimension in at least a z-direction to cause the vent opening to transition from a closed state to an open state.

Clause 2. The article of apparel according to clause 1, wherein the plurality of discrete overlay film structures are not affixed to the first panel.

Clause 3. The article of apparel according to any of clauses 1 through 2, wherein the plurality of discrete overlay film structures are affixed to an inner-facing surface of the second panel.

Clause 4. The article of apparel according to any of clauses 1 through 3, wherein the plurality of discrete overlay film structures are affixed to an outer-facing surface of the second panel.

Clause 5. The article of apparel according to any of clauses 1 through 4, wherein the plurality of discrete overlay film structures comprise a thermoplastic polyester elastomer.

Clause 6. The article of apparel according to any of clauses 1 through 5, wherein the each of the plurality of discrete overlay film structures has a thickness from about 30 microns to about 50 microns.

Clause 7. The article of apparel according to any of clauses 1 through 6, wherein the longitudinal axis of the vent opening extends in a first direction.

Clause 8. The article of apparel according to clause 7, wherein when the plurality of discrete overlay film structures are exposed to moisture, the second panel undergoes a decrease in dimension in the first direction.

Clause 9. The article of apparel according to any of clauses 1 through 8, wherein the plurality of discrete overlay film structures are affixed to the second panel at a location adjacent to the vent opening.

Clause 10. The article of apparel according to any of clauses 1 through 9, wherein the article of apparel is an upper-body garment.

Clause 11. The article of apparel according to any of clauses 1 through 9, wherein the article of apparel is a lower-body garment.

Clause 12. An article of apparel comprising: a first panel having a first panel edge; a second panel having a second panel edge, wherein the first panel edge is discontinuously affixed to the second panel edge to form a vent opening having a longitudinal axis extending in a first direction; and a plurality of discrete overlay film structures affixed to the second panel, wherein upon exposure to moisture the plurality of discrete overlay film structures undergo a change in dimension in at least a z-direction to cause the second panel to undergo a decrease in dimension in the first direction thereby transitioning the vent opening from a closed state to an open state.

Clause 13. The article of apparel according to clause 12, wherein each of the plurality of discrete overlay film structures includes a long axis and a short axis.

Clause 14. The article of apparel according to clause 13, wherein the long axis of the each of the plurality of discrete overlay film structures is oriented substantially perpendicular to the longitudinal axis of the vent opening.

Clause 15. The article of apparel according to any of clauses 12 through 14, wherein the plurality of discrete overlay film structures are not affixed to the first panel.

Clause 16. The article of apparel according to any of clauses 12 through 15, wherein the first panel does not undergo a decrease in dimension in the first direction when the plurality of discrete overlay film structures are exposed to moisture.

Clause 17. The article of apparel according to any of clauses 12 through 16, wherein the plurality of discrete overlay film structures comprise a thermoplastic polyester elastomer.

Clause 18. The article of apparel according to any of clauses 12 through 17, wherein each of the plurality of discrete overlay film structures has a thickness from about 30 microns to about 50 microns.

Clause 19. A method of manufacturing an article of apparel having a vent opening, the method of manufacturing comprising: discontinuously affixing a first panel edge of a first panel to a second panel edge of a second panel to form the vent opening, the vent opening having a longitudinal axis, wherein the first panel and the second panel at least partially form the article of apparel; and affixing a plurality of discrete overlay film structures to the second panel, each of the plurality of discrete overlay film structures including a long axis and a short axis, and wherein the long axes of the plurality of discrete overlay film structures are affixed to be substantially perpendicular to the longitudinal axis of the vent opening.

Clause 20. The method of manufacturing the article of apparel having the vent opening according to clause 19, wherein the plurality of discrete overlay film structures are affixed to the second panel at a location adjacent to the vent opening.

Clause 21. A textile comprising: a slit extending from a first surface of the textile to a second opposite surface of the textile, the slit comprising a first edge, an opposing second edge, a first end, a second end, and a longitudinal axis extending between the first end and the second end; a first plurality of discrete overlay film structures positioned adjacent to the first edge of the slit; and a second plurality of discrete overlay film structures positioned adjacent to the second edge of the slit, wherein each of the first plurality of discrete overlay film structures and each of the second plurality of discrete overlay film structures includes a long axis and a short axis, and wherein the long axes of the each of the first plurality of discrete overlay film structures and the each of the second plurality of discrete overlay film structures are oriented substantially perpendicular to the longitudinal axis of the slit.

Clause 22. The textile according to clause 21, wherein when the textile is exposed to an external stimulus, the first plurality of discrete overlay film structures and the second plurality of discrete overlay film structures undergo an increase in dimension in at least the z-direction to cause the slit to transition from a closed state to an open state.

Clause 23. The textile according to any of clauses 21 through 22, wherein the first plurality of discrete overlay film structures and the second plurality of discrete overlay film structures comprise a thermoplastic polyester elastomer.

Clause 24. The textile according to any of clauses 21 through 23, wherein the first plurality of discrete overlay film structures and the second plurality of discrete overlay film structures have a thickness from about 30 microns to about 50 microns.

Clause 25. The textile according to any of clauses 21 through 24, wherein the longitudinal axis of the slit extends in a first direction.

Clause 26. The textile according to clause 25, wherein when the first plurality of discrete overlay film structures and the second plurality of discrete overlay film structures are exposed to the external stimulus, the first edge and the second edge of the slit undergo a decrease in dimension in the first direction.

Clause 27. The textile according to any of clauses 21 through 26, wherein the textile is incorporated into an upper-body garment.

Clause 28. The textile according to any of clauses 21 through 26, wherein the textile is incorporated into a lower-body garment.

Clause 29. A textile construction comprising a first panel of material having a first plurality of apertures extending therethrough; a second panel of material positioned adjacent to the first panel of material, the second panel of material having a second plurality of apertures extending therethrough, wherein the first plurality of apertures are at least partially offset from the second plurality of apertures when the textile construction is in a closed state; and an overlay film structure affixed to and extending across a width of a first end of the second panel of material, wherein when the textile construction is exposed to moisture, the overlay film structure undergoes an increase in dimension in at least a z-direction to cause the second panel of material to shift in a lengthwise direction which at least partially aligns the second plurality of apertures with the first plurality of apertures to transition the textile construction to an open state.

Clause 30. The textile construction according to clause 29, wherein the first end of the second panel of material includes a first edge that is affixed to the first panel of material.

Clause 31. The textile construction according to any of clauses 29 through 30, wherein a first set of additional edges of the second panel of material are affixed to the first panel of material.

Clause 32. The textile construction according to any of clauses 29 through 31, wherein a second set of additional edges of the second panel of material are unaffixed from the first panel of material.

Clause 33. The textile construction according to any of clauses 29 through 32, wherein the overlay film structure is a thermoplastic polyester elastomer.

Clause 34. The textile construction according to any of clauses 29 through 33, wherein the overlay film structure has a thickness from about 30 microns to about 50 microns.

Clause 35. The textile construction according to any of clauses 29 through 24, wherein the overlay film structure includes a long axis and a short axis, and wherein the long axis of the overlay film structure extends across the width of the first end of the second panel of material.

Clause 36. The textile construction according to clause 35, wherein when the textile construction is exposed to moisture, the second panel of material shifts in a direction that is substantially perpendicular to the long axis of the overlay film structure.

Clause 37. The textile construction according to any of clauses 29 through 36, wherein the textile construction is incorporated into an upper-body garment.

Clause 38. The textile construction according to any of clauses 29 through 36, wherein the textile construction is incorporated into a lower-body garment.

BRIEF DESCRIPTION OF THE DRAWINGS

Examples of aspects herein are described in detail below with reference to the attached drawing figures, wherein:

FIG. 1A illustrates a perspective view of a first surface of an example textile having a plurality of discrete overlay film structures before the textile is exposed to an external stimulus in accordance with aspects herein;

FIG. 1B illustrates a perspective view of a second opposite surface of the textile of FIG. 1A in accordance with aspects herein;

FIG. 1C illustrates a cross-sectional view of the textile of FIG. 1A taken along cut line 1C-1C in accordance with aspects herein;

FIG. 1D illustrates a cross-sectional view of the textile of FIG. 1A taken along cut line 1D-1D in accordance with aspects herein;

FIG. 2A illustrates a perspective view of the first surface of the textile of FIG. 1A after the textile is exposed to the external stimulus in accordance with aspects herein;

FIG. 2B illustrates a perspective view of the second opposite surface of the textile of FIG. 2A in accordance with aspects herein;

FIG. 2C illustrates a cross-sectional view of the textile of FIG. 2A taken along cut line 2C-2C in accordance with aspects herein;

FIG. 2D illustrates a cross-sectional view of the textile of FIG. 2A taken along cut line 2D-2D in accordance with aspects herein;

FIG. 9A illustrates an example textile before being exposed to an external stimulus, where the textile has a slit and overlay film structures positioned adjacent to the slit in accordance with aspects herein;

FIG. 9B illustrates the textile of FIG. 9A after being exposed to the external stimulus and with the slit in an open state in accordance with aspects herein;

DETAILED DESCRIPTION

Figure 3A:
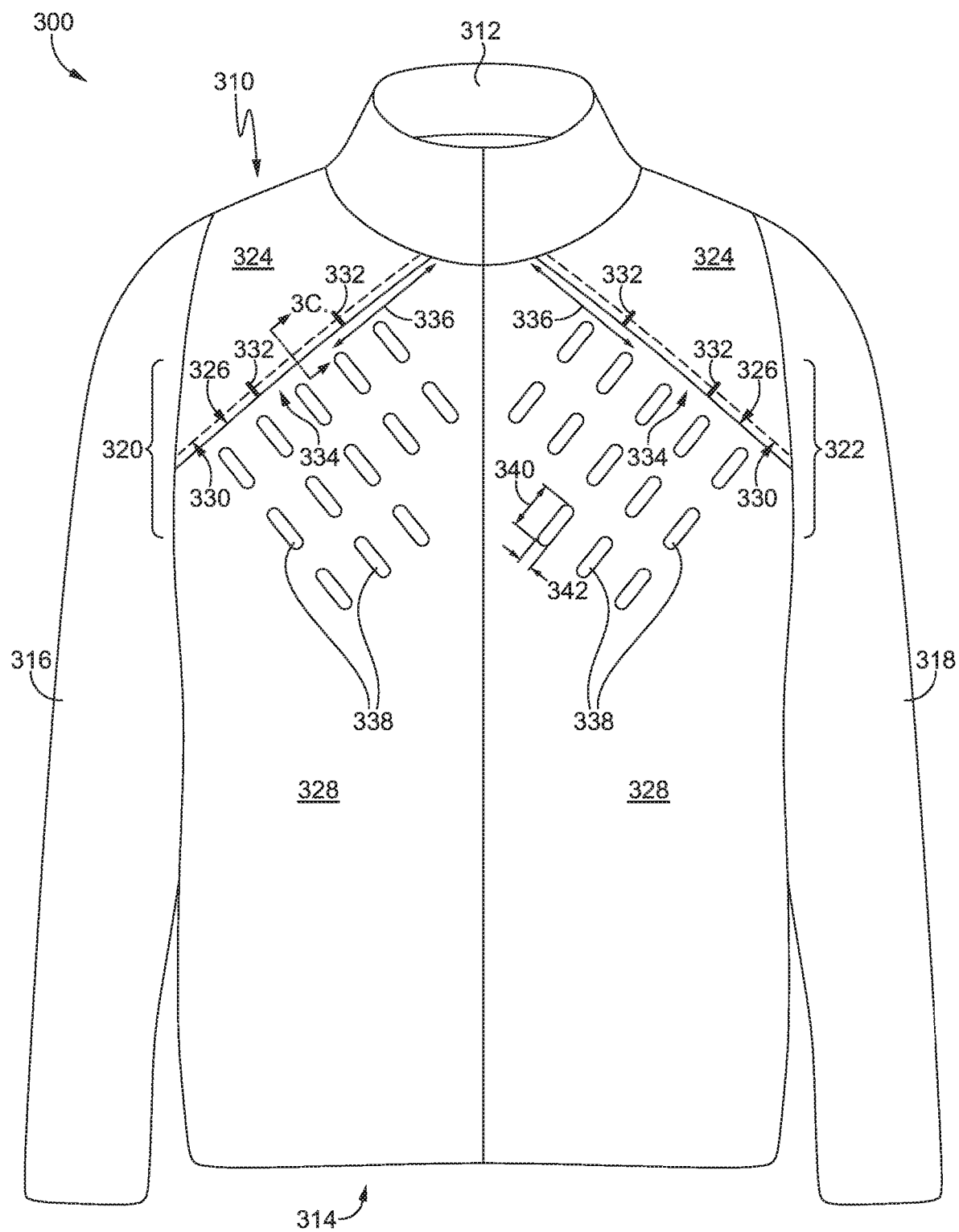
FIG. 3A illustrates a front view of an example upper-body garment having a plurality of discrete overlay film structures and an example vent opening in a closed state before the upper-body garment is exposed to an external stimulus in accordance with aspects herein.

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Vent structures on traditional articles of apparel generally open and close through use of a mechanical structure that requires human manipulation such as a zipper or fastener, passively open and close in response to air flowing in or out of the vent structure, or exist in a static state such as always open. Aspects herein provide for an article of apparel having one or more vent openings that dynamically transition to an open state when the article of apparel is exposed to an external stimulus such as, for example, moisture in the form of perspiration and that dynamically transition to a closed state when the external stimulus is removed. This allows needed venting when, for example, a wearer is exercising and a decrease in venting when the wearer is at rest without any manipulation of the article of apparel and/or the vent opening by the wearer. The dynamic transition of the vent opening between an open and closed state is achieved through use of discrete overlay film structures that are affixed to one of the panels forming the vent opening. The overlay film structures change in dimension (e.g., an increase in the z-direction) when exposed to the external stimulus which causes the underlying panel to undergo a change in dimension (e.g., a decrease in the x-direction)

thereby causing the vent opening to dynamically transition to an open state. Once the external stimulus removed, the overlay film structures and the underlying panel return to their pre-exposure dimensions causing the vent opening to transition to a closed state.

At a high level, the vent opening is formed by affixing the edges of a first panel and a second panel at a first location and a second location, and not affixing the edges of the first panel and the second panel between the first and second locations, to form the vent opening between the opposing edges. The vent opening has a longitudinal axis extending in a first direction. A plurality of discrete overlay film structures that swell or increase in dimension in response to an external stimulus such as moisture are affixed to the second panel adjacent to the vent opening. The discrete overlay film structures include a long axis and a short axis, and the film structures are oriented so that the long axes of the film structures are oriented substantially perpendicular to the longitudinal axis of the vent opening. In example aspects, the film structures are not applied to the first panel. When the article of apparel is exposed to the external stimulus, the film structures undergo a change in dimension such as, for example, an increase in height in the z-direction, an increase in length in the y-direction, and/or an increase in width in the x-direction. Because the film structures are fully adhered to the second panel, the change in dimension of the film structures causes the second panel to undergo a decrease in dimension in the first direction (i.e., in line with the longitudinal axis of the vent opening) due to the second panel "puckering" or being tensioned in the z-direction in areas underlying the overlay film structures. Because the first panel does not include any film structures, the first panel does not undergo an appreciable change in dimension when exposed to the external stimulus.

The decrease in dimension of the second panel in the first direction due to the overlay film structures and the lack of change in dimension of the first panel causes the vent opening to transition from a closed state to an open state. To state this differently, when the article of apparel is exposed to the external stimulus, the second panel edge decreases in length while the length of the first panel edge remains essentially unchanged resulting in the affixed ends of the first panel edge being tensioned toward one another causing the vent opening to transition to an open state. When the external stimulus is removed, the overlay film structures transition back to their pre-exposure state, the puckering or deformation of the second panel relaxes, and the vent opening transitions to a closed state.

As used herein, the term "article of apparel" encompasses any number of products meant to be worn by a wearer including upper-body garments (e.g., shirts, jackets, hoodies, pullovers), lower-body garments (e.g., pants, shorts, leggings), articles of footwear such as shoes or socks, articles of headwear (e.g., hats), gloves, sleeves (e.g., arm sleeves, calf sleeves), and the like. Positional terms used when describing the article of apparel such as front, back, inner-facing surface, outer-facing surface, upper, lower, proximal, distal, medial, lateral, and the like are with respect to the article of apparel being worn as intended with the wearer standing upright. As such, when the article of apparel is in the form of an upper-body garment or a lower-body garment, the front of the article of apparel is configured to cover, for instance, a front torso area, a front arm area, or a front leg area of the wearer, and the back of the article of apparel is configured to cover the back torso area, the back arm area, or the back leg area of the wearer. Similarly, the inner-facing surface of the article of apparel is configured to be in face-sharing contact (defined as a surface of a first substrate that is in contact or near contact with a surface of a second substrate) with a wearer's skin surface or a base layer, and the outer-facing surface of the article of apparel is configured to face toward the external environment.

The term "z-direction" as used herein to describe a dimensional change in, for example, the overlay film structures and/or a panel to which the film structures are affixed means a direction that extends away from the surface of the upper- or lower-body garments in a positive or negative direction. The terms "x-direction" and "y-direction" when referring to, for instance, a change in dimension of the overlay film structures and/or a panel to which the film structures are affixed, means a direction extending along the surface of the upper- or lower-body garments.

The term "external stimulus" as used herein encompasses any number of stimuli such as temperature, pressure, moisture, electrical energy, magnetic energy, light, sound, and the like. In one example aspect, the external stimulus is moisture where the moisture can be in the form of liquid water, water vapor, perspiration, and the like.

The term "vent opening" as used herein means an opening formed in an article of apparel that provides a fluid (e.g., gas, liquid) communication path between the external environment and the interior of the article of apparel (e.g., the space between the inner-facing surface of the article of apparel and the wearer's body). The vent opening is formed by affixing panel edges of a first panel and a second panel at spaced-apart securement points. The term "edge" as used herein means a terminal, unaffixed end of a panel. The term "longitudinal axis" used when describing the vent opening is an axis that is parallel to the longest dimension of the vent opening. To state this differently, the "longitudinal axis" of a vent opening linearly extends between adjacent securement points. The term "closed state" when describing the vent opening means a state where the first and second panels and their respective edges are in an abutting relationship at a location between adjacent securement points. The abutting relationship may mean contact between the surfaces of the panels, contact between the respective edges of the panels, or near contact between the surfaces and/or the edges of the first and second panels. The term "open state" when describing the vent opening means a state where the first and second panels and their respective edges are no longer in an abutting relationship at the location between adjacent securement points. For instance, the surfaces and/or edges of the first and second panels may be spaced apart from about 1 mm to about 30 mm. As used herein, the term "about" means within ±5% of a designated value. The term "dynamic" or "dynamically" used when describing the vent opening transitioning from a closed state to an open state or vice versa generally means a mechanical action that occurs without human manipulation of the article of apparel while the article of apparel is unworn, is in a controlled environment (e.g., standard ambient temperature and pressure (25 degrees Celsius and 101.325 kPa of pressure)), and is not subject to wind conditions.

The term "first panel" and/or "second panel" as used herein means any textile, material or fabric that is used to form, at least in part, an article of apparel and/or a vent structure on an article of apparel. With respect to the second panel, the degree of puckering or movement of the second panel in the z-direction caused by swelling of the overlay film structures may be dependent on a number of factors associated with the second panel. For example, the degree of movement of the second panel in the z-direction may be dependent on the moisture regain value of the yarn(s) used to form the second panel where moisture regain is defined as the percentage of moisture an oven-dry fiber or filament will absorb from the air when at standard temperature and relative humidity. As an example, when the second panel is formed from yarns having a low moisture regain, such as polyester or nylon, the second panel may undergo a greater degree of deformation or puckering compared to when the second panel is formed from yarns having a high moisture regain, such as cotton. This is because yarns having a high moisture regain will typically absorb moisture causing the yarn to swell or expand which counteracts the tensioning forces generated by the swelling of the overlay film structures and results in a lesser degree of puckering of the second panel.

Another factor that influences the degree of movement of the second panel in the z-direction is its weight. In aspects, the second panel may comprise a lightweight fabric (e.g., from about 30 grams per square meter (gsm) to about 150 gsm) or an ultra-lightweight fabric (e.g., from about 10 gsm to about 100 gsm) although heavier weight fabrics are contemplated herein. Lightweight and ultra-lightweight fabric may pucker to a greater degree than heavier weight fabrics. In further example aspects, the degree of movement of the second panel in the z-direction may be dependent on the presence of elastomeric yarns that exhibit stretch and recovery properties such as, for example, Spandex®. When, for example, textile types, textile weights, and textile constructions (e.g., knit or woven) are the same, the presence of elastomeric yarns may cause the second panel to exhibit a greater degree of movement in the z-direction compared to when the second panel does not include elastomeric yarns. Thus, the degree of movement of the second panel in the z-direction may be adjusted based on the type of yarn used to form the second panel, the weight of the second panel, and/or the use of elastomeric yarns in the second panel.

The term "discrete overlay film structure" as used herein refers to a film application on the second panel where each film structure is spaced apart on all sides from (i.e., discrete from) an adjacent film structure by an expanse or portion of the second panel. In example aspects, the film is fully adhered to the second panel through, for instance, an intermediate adhesive layer, melting or partially melting the film when applying it to the second panel, and the like. Aspects herein contemplate that the film may comprise any film that expands in one or more of the x-direction, the y-direction, and/or the z-direction when exposed to an external stimulus such as moisture while remaining affixed or adhered to the second panel. In an example aspect, the film may comprise a thermoplastic polyester elastomer (TPEE), and more specifically a poly-butylene terephthalate based (PBT-based) TPEE film that is configured to transport or diffuse moisture from one surface of the film to a second opposite surface of the film. The transport of the moisture may be facilitated by the presence of hydrophilic molecules (molecules that attract or have an affinity for water) within the film where a greater number of hydrophilic molecules may result in a greater transport of moisture. The movement of moisture through the film may be measured using a water vapor transmission test such as, for instance, ASTM E96 B, and in example aspects, the water vapor transmission rate of the film may be from about 600 g/m²/day to about 10,000 g/m²/day, from about 1,000 g/m²/day to about 9,000 g/m²/day, from about 3,000 g/m²/day to about 8,000 g/m²/day, from about 5,000 g/m²/day to about 7,000 g/m²/day, or about 6,000 g/m²/day. An example PBT-based TPEE film is TPEE48 manufactured by Far Eastern New Century Corporation in Taipei, Taiwan.

The amount of movement of the underlying second panel in the z-direction caused by the film structures may be dependent on the thickness of the film structures. The amount of movement of the underlying second panel in the z-direction may also be dependent on the surface area of the film structures. Aspects herein contemplate the film structures having a thickness from about 20 microns to about 100 microns, from about 25 microns to about 90 microns, from about 30 microns to about 80 microns, from about 35 microns to about 70 microns, or about 40 microns. In general, a thicker film structure will cause more movement of the second panel in the z-direction than a thinner film structure dependent on the film structure's thickness being such that moisture is able to diffuse through the film structure within a reasonable time frame. Additionally, a film structure with a greater surface area will cause more deformation of the second panel than a film structure with a smaller surface area.

Unless otherwise noted, all measurements provided herein are with the article of apparel in an un-worn, resting state and at standard ambient temperature and pressure.

FIG. 1 illustrates a perspective view of a first surface 105 of a textile 100 used to form a vent opening in an article of apparel (e.g., the second panel referenced above) before the textile 100 is exposed to an external stimulus. The textile 100 has a width 112 in the x-direction and a length 114 in the y-direction. The textile 100 includes a plurality of discrete overlay film structures 110. As shown in the magnified view of FIG. 1, the discrete overlay film structures 110 have a generally oval shape with a long axis 115 of each of the film structures 110 oriented in the y-direction and a short axis 117 of each of the film structures 110 oriented in the x-direction; the long axis 115 is longer than the short axis 117. The dimensions of the long axis 115 and the short axis 117 are variable and dependent upon the intended use of the overlay film structures 110. The shape and the orientation of the discrete overlay film structures 110 are illustrative only, and other shapes and orientations are contemplated herein. Using multiple, discrete overlay film structures as opposed to a continuous film allows for more exposure of the textile 100 which can provide functional advantages based on the characteristics of the textile 100 such as moisture wicking, permeability, breathability, and the like. Also, use of discrete overlay film structures as opposed to a continuous film allows for fine-tuning of where deformation of the textile 100 is desired.

The discrete overlay film structures 110 are shown as being applied in a gradient pattern with a greater concentration of the overlay film structures 110 in a first location 116 adjacent to a first edge 113 of the textile 100 compared to a second location 118 of the textile 100 adjacent to an opposite second edge 119 of the textile 100. When the textile 100 is incorporated into an article of apparel, the first edge 113 may form, at least in part, the vent opening. The difference in concentration may be due to, for instance, a decrease in the number of film structures 110 per unit area in the second location 118. The difference in concentration may also be due to a change in the size or surface area of the individual film structures 110 per unit area. As used herein, the term "unit area" means the area of a 1 cm×1 cm square. Applying the film structures 110 in a gradient pattern allows for a customization of the degree of deformation of the textile 100 when the textile 100 is exposed to an external stimulus. For instance, more deformation of the textile 100 may occur in the first location 116 compared to the second location 118. In example aspects, and as shown, the overlay film structures 110 are applied in a grid pattern having generally linear columns and rows of film structures 110. Applying the film structures 110 in a grid pattern enables the textile 100 to linearly bend or fold in areas between adjacent columns and/or rows of film structures 110 which, for example, improves pliability of the textile 100.

FIG. 1B is a perspective view of a second opposite surface 130 of the textile 100 before the textile 100 is exposed to the external stimulus. As shown, the second surface 130 is generally planar or smooth. In example aspects, the second surface 130 may not include any film structures 110 although it is contemplated herein that film structures 110 may additionally be applied to the second surface 130 of the textile 100.

FIG. 1C is a cross-sectional view of the textile 100 in the x-direction (cut line 1C-1C of FIG. 1A), and FIG. 1D is a cross-sectional view of the textile 100 in the y-direction (cut line 1D-1D of FIG. 1A). The film structures 110 have a thickness 140 before being exposed to an external stimulus. As shown, the film structures 110 are affixed to the first surface 105 of the textile 100 and are fully adherent to the textile 100.

FIG. 2A is a perspective view of the first surface 105 of the textile 100 after the textile 100 is exposed to an external stimulus. Upon exposure to the external stimulus, the film structures 110 swell and/or increase in dimension primarily in, for example, the positive z-direction. The film structures 110 may also increase in dimension in the positive and/or negative x-direction, and/or the positive and/or negative y-direction (i.e., the film structures 110 omni-directionally expand). When the external stimulus is moisture, and the film structures 110 are formed from a PBT-based TPEE film, the swelling of the film structures 110 may be due to the water molecules diffusing through the film. Because the film structures 110 are adhered to the textile 100, as the film structures 110 increase in dimension, the film structures 110 may "lift" the textile 100 in the areas underlying the film structures 110 or cause the textile 100 to move in the positive z-direction in the areas underlying the film structures 110. The result is that the textile 100 "puckers" to form debossed regions 210 that extend concavely away from the second surface 130 of the textile 100 and toward the first surface 105. This aspect is shown in FIG. 2B which is a depiction of the second surface 130 of the textile 100 after the textile 100 has been exposed to the external stimulus.

In example aspects, when exposed to the external stimulus, the film structures 110 may fold or bend more along their long axes 115 and/or parallel to the long axes 115 compared to their short axes 117 resulting in a greater deformation of the textile 100 in the x-direction compared to the y-direction. The greater folding or bending along the long axis 115 may be because there is less volume of the textile 100 to be moved as measured across the short axis 117 of the film structures 110 compared to along the long axis 115 of the film structures 110. This is shown in FIG. 2C which is a cross-sectional view of the textile 100 in the x-direction of the textile 100 (cut line 2C-2C of FIG. 2A), and FIG. 2D which is a cross-sectional view of the textile 100 in the y-direction (cut line 2D-2D of FIG. 2A). As shown in FIG. 2C, after exposure to the external stimulus, the film structures 110 have a thickness 216 where the thickness 216 is greater than the thickness 140. FIG. 2C further depicts the film structures 110 folding or bending along their long axis 115 causing the underlying textile 100 to also fold or bend in the x-direction which creates the debossed regions 210. As shown in FIG. 2D, there is less folding or bending of the film structures 110 along their short axis 117 and thus less deformation of the textile 100 in the y-direction. Based on the cumulative effect of the debossed regions 210, the overall width 112 of the textile 100 may decrease to a new width 212. There may also be a decrease in the overall length 114 of the textile 100 to a new length 214. In example aspects, because of the orientation of the film structures 110, there may be a greater decrease in the width of the textile 100 compared to the length of the textile 100. To describe this more generally, to achieve a desired decrease of the textile 100 in a specified direction, the film structures 110 may be oriented such that their long axes are perpendicular to the specified direction.

When the film structures 110 are no longer exposed to, for example, moisture, the film structures 110 undergo a decrease in swelling due to a reduction or cessation of water molecules moving through the film structures 110. The film structures 110 return to their pre-exposure, generally planar state, the debossed regions 210 relax, and the textile 100 reverts to its pre-exposure width 112 and length 114. Thus, use of the film structures 110 enables a reversible and dynamic change in the dimensions of the textile 100.

The use of film structures to achieve a change in dimension of a textile may be used to dynamically transition a vent opening on an article of apparel from a closed state to an open state and vice versa. For instance, FIG. 3A depicts a front view of an upper-body garment 300 before the upper-body garment 300 is exposed to an external stimulus, where the upper-body garment 300 has a vent opening in a closed state, and FIG. 3B depicts a front view of the upper-body garment 300 after the upper-body garment 300 has been exposed to an external stimulus and the vent opening has transitioned to an open state.

The upper-body garment 300 includes a torso region 310 having a neck opening 312 and a waist opening 314. A first sleeve 316 and a second sleeve 318 extend from the torso region 310. Although the upper-body garment 300 is shown with long sleeves, it is contemplated herein that the upper-body garment 300 may be sleeveless, include three-quarter sleeves, half-sleeves, quarter-sleeves, and the like. In addition, although the torso region 310 is shown as including a first front half and a second front half that are joined together through a slider mechanism (e.g., a zipper), it is contemplated herein that the torso region 310 may be in the form of a t-shirt or pullover that does not include a slider mechanism such that a material extends across a midline of the upper-body garment 300.

The upper-body garment includes a first vent structure 320 and a second vent structure 322. The first vent structure 320 and the second vent structure 322 are similarly formed and, as such, a description of how the first vent structure 320 is formed is equally applicable to the second vent structure 322. Referring to FIG. 3A, the first vent structure 320 includes a first panel 324 having a first panel edge 326 and a second panel 328 having a second panel edge 330 (shown in dashed lines to indicate it is generally hidden from view when the vent opening is in a closed state). In example aspects, the first panel edge 326 overlaps the second panel edge 330 and is discontinuously affixed thereto. For example, the first panel edge 326 may be affixed to the second panel edge 330 at a number of spaced-apart securement points such as securement points 332. The securement points 332 may be formed by stitching, tacking, adhesives, bonding, and the like. The first panel edge 326 is not affixed to (or is unaffixed from) the second panel edge 330 at areas between the spaced-apart securement points 332 to form one or more vent openings 334. The longitudinal axis of the vent openings 334 extends in a first direction as indicated by the arrow 336. The location and number of the first and second vent structures 320 and 322 is illustrative only, and it is contemplated herein that one or more vent structures may be located at other areas of the upper-body garment 300 including, for instance, other locations on the torso region 310, the first sleeve 316, the second sleeve 318, and/or the back of the upper-body garment 300 (shown in FIGS. 4A and 4B).

Figure 3B:
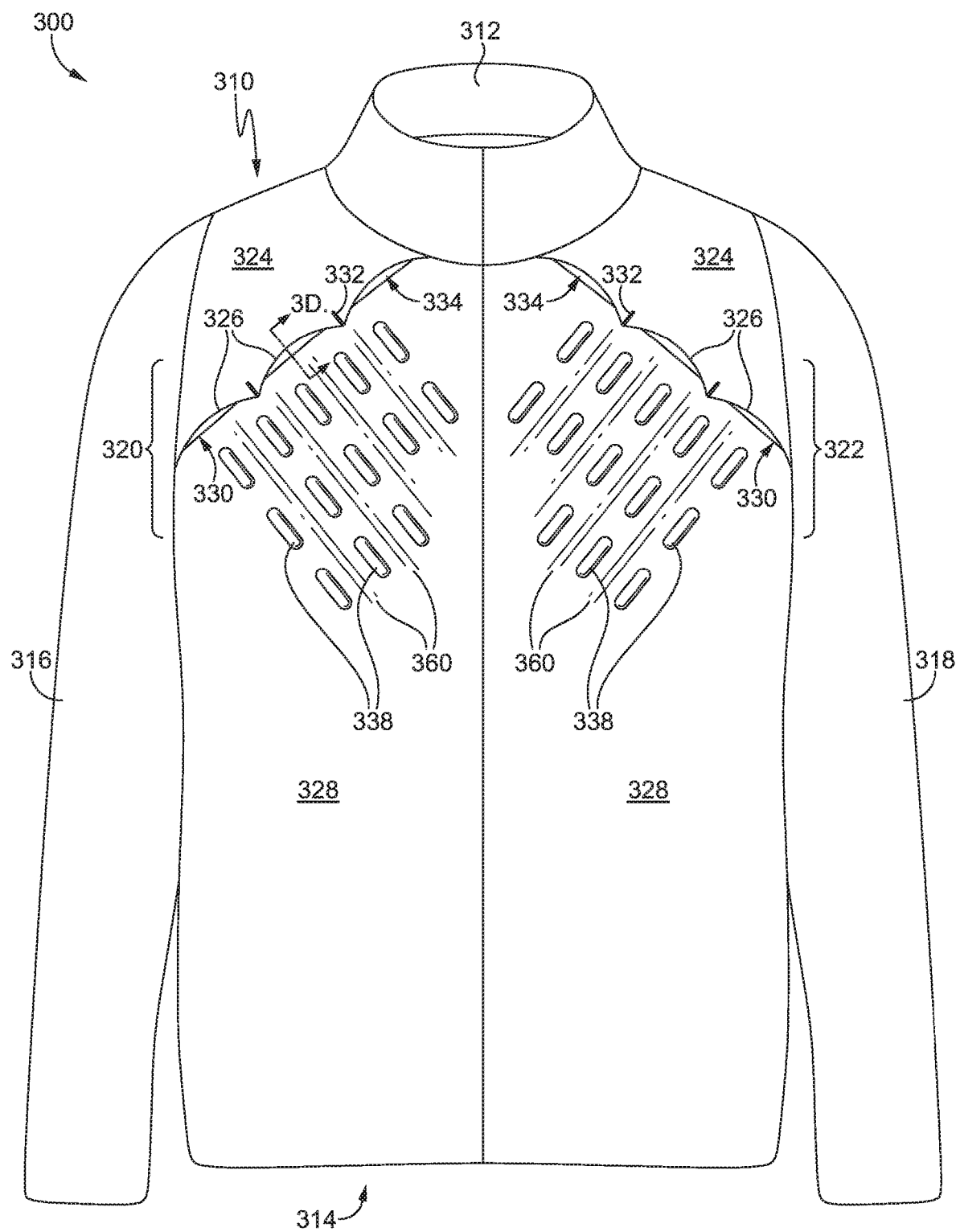
FIG. 3B illustrates a front view of the upper-body garment of FIG. 3A after the upper-body garment is exposed to the external stimulus and the vent opening has transitioned to an open state in accordance with aspects herein.

FIG. 3A further depicts a plurality of discrete overlay film structures 338 affixed to the second panel 328 adjacent to (e.g., within about 0 cm to about 10 cm) the vent opening(s) 334 or the second panel edge 330. As illustrated, the first panel 324 does not include discrete overlay film structures in accordance with aspects herein. The film structures 338 are shown affixed to an outer-facing surface of the second panel 328. In example aspects, the film structures 338 may instead be applied to an inner-facing surface of the second panel 328 in a similar pattern to that shown in FIGS. 3A and 3B. Positioning the film structures 338 on the inner-facing surface of the second panel 328 enables the film structures 338 to be in contact with (or near contact with) a wearer's body surface and any perspiration produced by the wearer. It is also contemplated herein that the film structures 338 may be applied to both the inner-facing surface and the outer-facing surface of the second panel 328. Any and all aspects, and any variation thereof, are contemplated as being within aspects herein.

Similar to the film structures 110 of FIGS. 1A-1D, the film structures 338 have a long axis 340 and a short axis 342. The long axes 340 of the film structures 338 are oriented to be substantially perpendicular (i.e., within ±10 degrees of perpendicular) to the longitudinal axis of the vent opening(s) 334. To state it differently, the long axes 340 of the film structures 338 are oriented to be substantially perpendicular to the first direction 336. In example aspects, there is a greater concentration of the film structures 338 closer to the vent opening(s) 334 and/or the second panel edge 330 compared to farther away from the vent opening(s) 334 and/or second panel edge 330 to facilitate the transition of the vent opening(s) 334 to an open state. The decrease in concentration of the film structures 338 may be due to a decrease in the number of film structures 338. The decrease in concentration may also be due to a decrease in the surface area of the film structures 338. The decrease in concentration may additionally be due to both a decrease in the number of film structures 338 and a decrease in the surface area of the film structures 338. Any and all aspects, and any variation thereof, are contemplated as being within aspects herein. The number and shape of the film structures 338 is illustrative only, and it is contemplated herein that other shapes and numbers of film structures 338 may be utilized.

FIG. 3B illustrates the upper-body garment 300 after the garment 300 has been exposed to an external stimulus such as moisture. When the film structures 338 are affixed to an inner-facing surface of the upper-body garment 300, the moisture may be in the form of perspiration produced by a wearer. As explained with the textile 100, exposure of the film structures 338 to the external stimulus causes the film structures 338 to expand, for instance, at least in the z-direction and/or in the x-direction and the y-direction, and to fold or bend at least along their long axes 340. Because each of the long axes 340 are oriented substantially perpendicular to the longitudinal axis of the vent opening(s) 334, the folding or bending of the film structures 338 along their long axes 340 causes the second panel 328 and the second panel edge 330 to shorten in the first direction 336 based on the lifting or puckering of the second panel 328 caused by the film structures 338 as shown by fold lines 360 in FIG. 3B. Since the first panel 324 does not include film structures, exposure of the upper-body garment 300 to the external stimulus does not cause a shortening of the first panel 324 or the first panel edge 326 in the first direction 336. The shortening of the second panel 328 and the second panel edge 330 results in the first panel 324 and/or the first panel edge 326 extending outwardly (e.g., in the positive z-direction) between adjacent securement points 332 which dynamically transitions the vent opening 334 to an open state as shown in FIG. 3B.

Figure 3C:
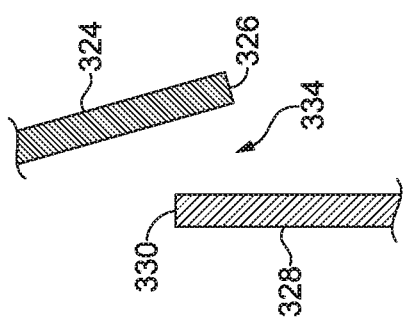
FIG. 3C illustrates a cross-section taken along cut line 3C-3C of FIG. 3A showing the vent opening in the closed state in accordance with aspects herein.
Figure 3D:
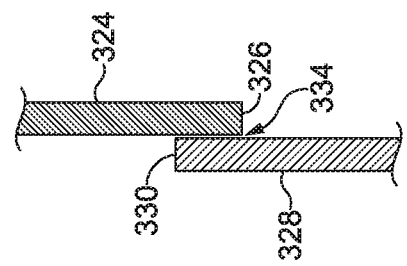
FIG. 3D illustrates a cross-section taken along cut line 3D-3D of FIG. 3B showing the vent opening in the open state in accordance with aspects herein.

The transition of the vent opening 334 from a closed state to an open state is further shown in FIGS. 3C-3F. FIG. 3C illustrates a cross-section of the vent opening 334 taken along cut line 3C-3C of FIG. 3A before the upper-body garment 300 is exposed to the external stimulus. FIG. 3C depicts the first panel edge 326 of the first panel 324 overlapping the second panel edge 330 of the second panel 328. As shown, the second panel edge 330 is positioned internal to the first panel edge 326. The vent opening 334 is formed between the overlapping edges 326 and 330 and is depicted in a closed state. FIG. 3D illustrates a cross-section of the vent opening 334 taken along cut line 3D-3D of FIG. 3B after the upper-body garment 300 is exposed to the external stimulus. As shown, the first panel 324 and the first panel edge 326 are spaced apart from the second panel 328 and the second panel edge 330 causing the vent opening 334 to transition to an open state.

Figure 3E:
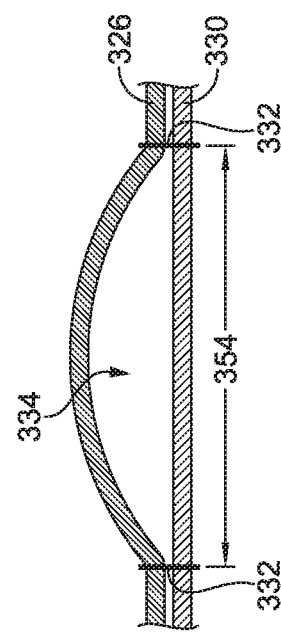
FIG. 3E illustrates a view taken along a longitudinal axis of the vent opening of FIG. 3A in accordance with aspects herein.

FIG. 3E illustrates the vent opening 334 taken along the longitudinal axis of the vent opening 334 before the upper-body garment 300 is exposed to the external stimulus. The first panel edge 326 is affixed to the second panel edge 330 at securement points 332. The first panel edge 326 is unaffixed from the second panel edge 330 between the securement points 332 to form the vent opening 334. Before the upper-body garment 300 is exposed to the external stimulus, the second panel edge 330 has a length 350 between the securement points 332, and the first panel edge 326 has a length 352 between the securement points 332. In example aspects, the length 350 of the second panel edge 330 is substantially the same as the length 352 of the first panel edge 326.

Figure 3F:
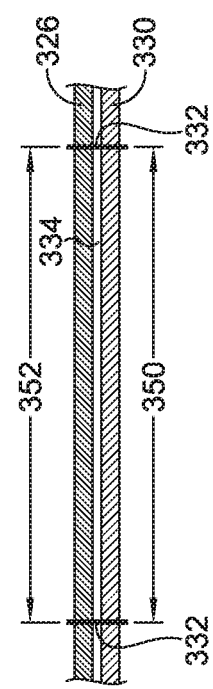
FIG. 3F illustrates a view taken along the longitudinal axis of the vent opening of FIG. 3B in accordance with aspects herein.

FIG. 3F illustrates the vent opening 334 taken along the longitudinal axis of the vent opening 334 after the upper-body garment 300 is exposed to the external stimulus. Due to the film structures 338 causing the second panel 328 to lift or pucker in areas underlying the film structures 338, the second panel edge 330 decreases in length to a new length 354 that is less than the length 350. Because the film structures 338 are not applied to the first panel 324, the first panel edge 326 does not undergo an appreciable change in length when the upper-body garment 300 is exposed to the external stimulus. Thus, the shortening of the second panel edge 330 tensions the affixed ends of the first panel edge 326 toward each other to cause the first panel 324 and the first panel edge 326 to extend outward from the upper-body garment 300 and transition the vent opening 334 to an open state. FIGS. 3C-3F may equally apply to the discussion of additional vent openings on the upper-body garment 300 as well as vent openings on other articles of apparel such as the lower-body garment 500 of FIGS. 5A-5B.

Figure 4A:
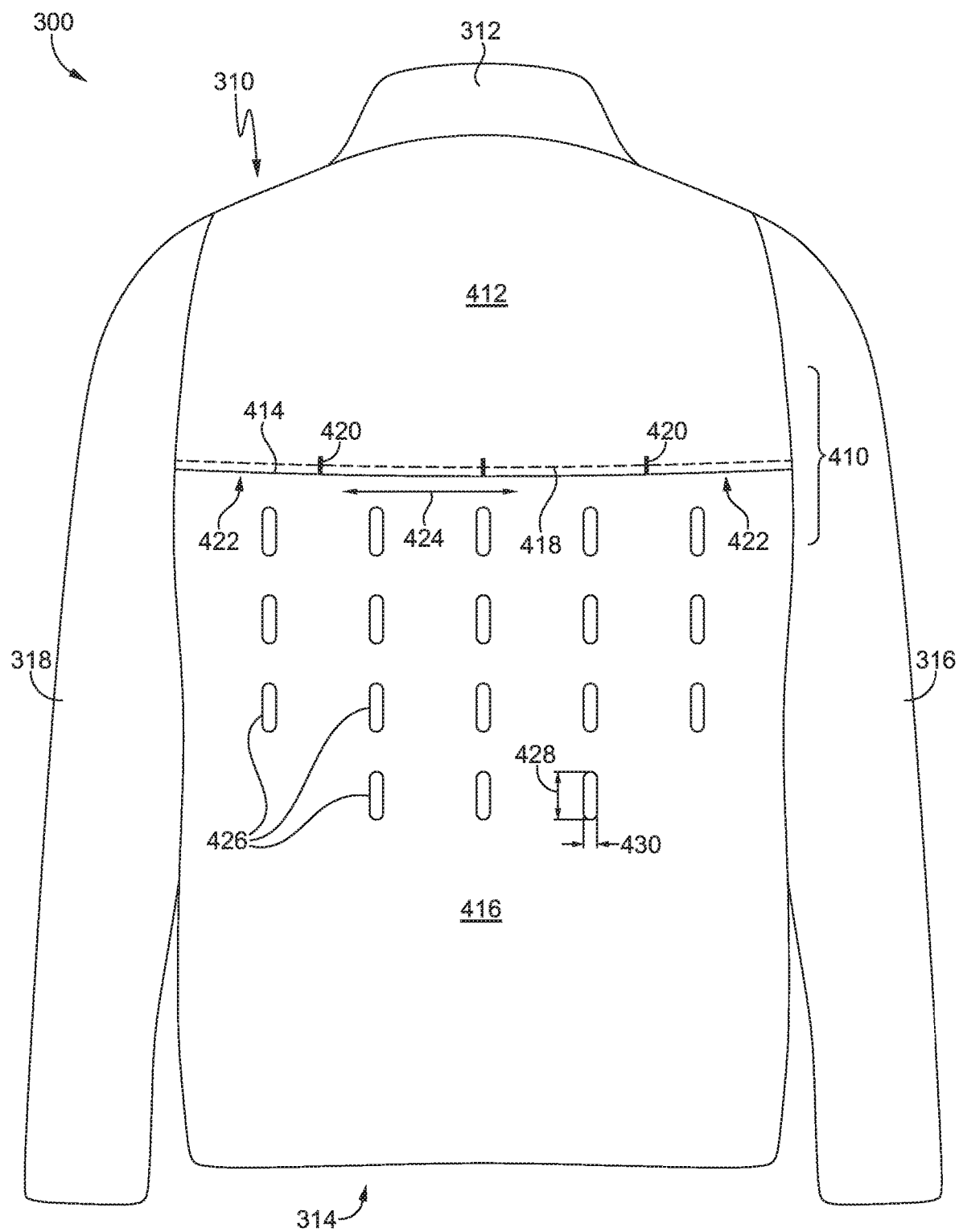
FIG. 4A illustrates a back view of an example upper-body garment having a plurality of discrete overlay film structures and an example vent opening in a closed state before the upper-body garment is exposed to an external stimulus in accordance with aspects herein.
Figure 4B:
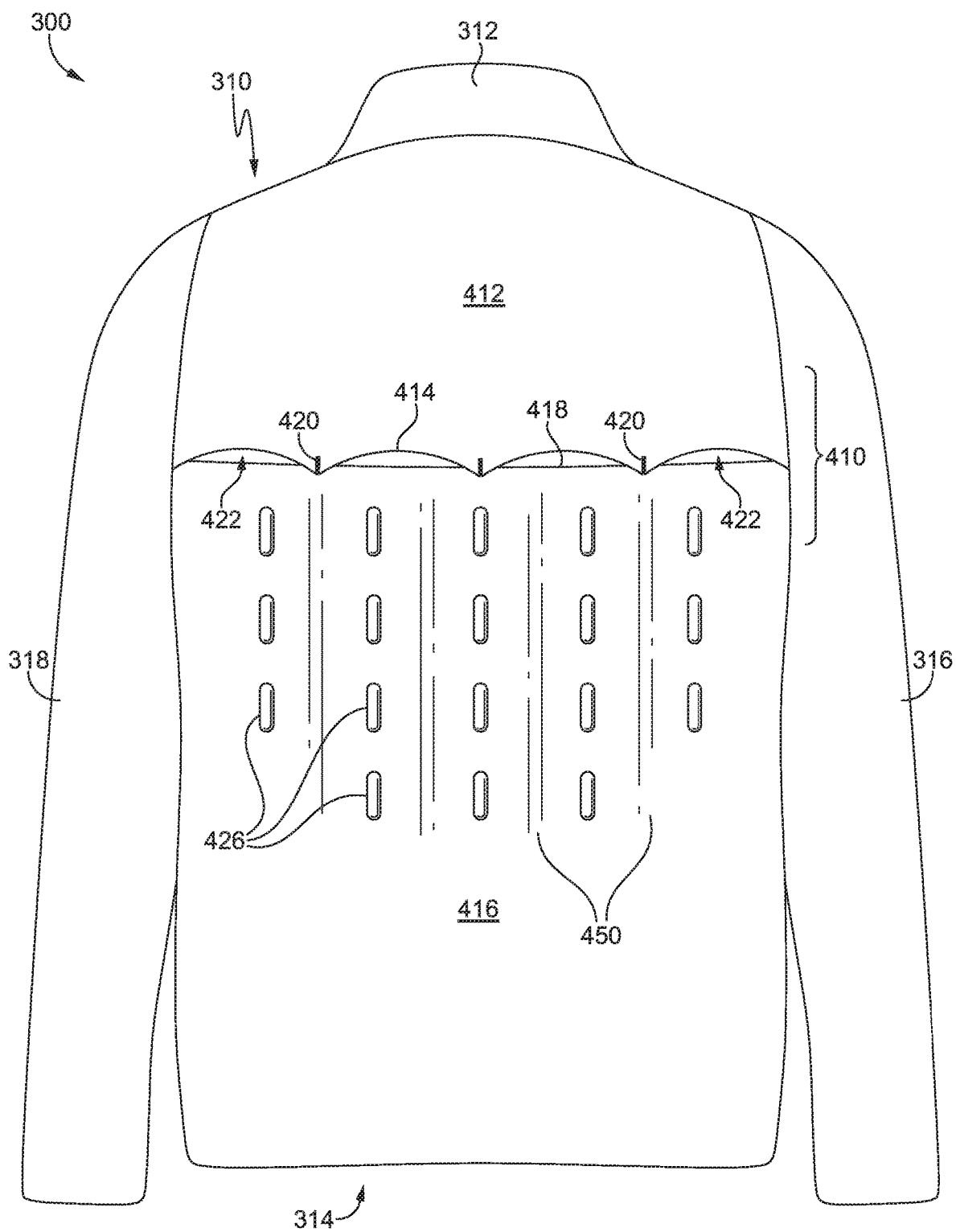
FIG. 4B illustrates a back view of the upper-body garment of FIG. 4A after the upper-body garment is exposed to the external stimulus and the vent opening has transitioned to an open state in accordance with aspects herein.

FIGS. 4A and 4B, which illustrate a back view of the upper-body garment 300, depict a vent structure 410 for the upper-body garment 300. The vent structure 410 may be in addition to, or instead of, the first vent structure 320 and/or the second vent structure 322. FIG. 4A illustrates a view of the upper-body garment 300 before the garment 300 is exposed to an external stimulus, and FIG. 4B illustrates the garment 300 after being exposed to the external stimulus such as, for example, moisture.

With respect to FIG. 4A, the vent structure 410 includes a first panel 412 having a first panel edge 414 and a second panel 416 having a second panel edge 418 (shown in dashed lines to indicate it is generally hidden from view). The first panel edge 414 overlaps the second panel edge 418 and is secured to the second panel edge 418 by one or more spaced-apart securement points 420. The first panel edge 414 is not affixed to (or is unaffixed from) the second panel edge 418 at areas between the spaced-apart securement points 420 to form one or more vent openings 422. The longitudinal axis of the vent openings 422 extends in a first direction as indicated by the arrow 424. In the aspect shown in FIG. 4A, the first direction 424 extends horizontally between the first sleeve 316 and the second sleeve 318. The location of the vent structure 410 is illustrative only and it is contemplated herein that the vent structure may be located closer to, for instance, the neck opening 312 or closer to, for example, the waist opening 314 of the upper-body garment 300. It is also contemplated herein that additional vent structures may be located on the back of the upper-body garment 300. Any and all aspects, and any variation thereof, are contemplated as being within aspects herein.

FIG. 4A further depicts a plurality of discrete overlay film structures 426 affixed to the second panel 416 adjacent to (e.g., within about 0 cm to 10 cm) the vent opening(s) 422 and/or the second panel edge 418. As illustrated, the first panel 412 does not include discrete overlay film structures in accordance with aspects herein. The film structures 426 are shown affixed to an outer-facing surface of second panel 416. In example aspects, the film structures 426 may instead be applied to an inner-facing surface of the second panel 416 in a pattern similar to that shown so as to be in contact with (or near contact with) a wearer's body surface and any perspiration produced by the wearer. It is also contemplated herein, that the film structures 426 may be applied to both the outer-facing surface and the inner-facing surface of the second panel 416. Any and all aspects, and any variation thereof, are contemplated as being within aspects herein.

The film structures 426 have a long axis 428 and a short axis 430. The long axes 428 of the film structures 426 are oriented to be substantially perpendicular (i.e., within ±10 degrees of perpendicular) to the longitudinal axis of the vent opening(s) 422 and/or the first direction 424. In example aspects, there is a greater concentration of the film structures 426 closer to the vent opening(s) 422 and/or the second panel edge 418 compared to farther away from the vent opening(s) 422 and/or the second panel edge 418 to facilitate the transition of the vent opening(s) 422 to an open state. The decrease in concentration of the film structures 426 may be due to a decrease in the number of film structures 426. The decrease in concentration may also be due to a decrease in the surface area of the film structures 426. The decrease in concentration may also be due to both a decrease in the number of film structures 426 and in the surface area of the film structures 426. The number and shape of the film structures 426 is illustrative only, and it is contemplated herein that other shapes and numbers of film structures 426 may be utilized.

FIG. 4B illustrates the upper-body garment 300 after the garment 300 has been exposed to an external stimulus such as moisture. When the film structures 426 are affixed to an inner-facing surface of the second panel 416, the moisture may be in the form of perspiration produced by a wearer. Exposure of the film structures 426 to the external stimulus causes the film structures 426 to expand, for instance, at least in the z-direction and/or in the x-direction and/or the y-direction, and to fold or bend at least along their long axes 428. Because each of the long axes 428 are oriented substantially perpendicular to the longitudinal axis of the vent opening(s) 422 and/or the first direction 424, the folding or bending of the film structures 426 along their long axes 428 causes the second panel 416 and the second panel edge 418 to shorten in the first direction 424 based on the lifting or puckering of the second panel 416 caused by the film structures 426 as shown by fold lines 450. Since the first panel 412 does not include film structures, exposure of the upper-body garment 300 to the external stimulus does not cause an appreciable shortening of the first panel 412 or the first panel edge 414 in the first direction 424. The shortening of the second panel 416 and the second panel edge 418 results in the first panel 412 and the first panel edge 414 extending outwardly (e.g., in the positive z-direction) between adjacent securement points 420 which dynamically transitions the vent opening 422 to an open state as shown in FIG. 4B.

Figure 5A:
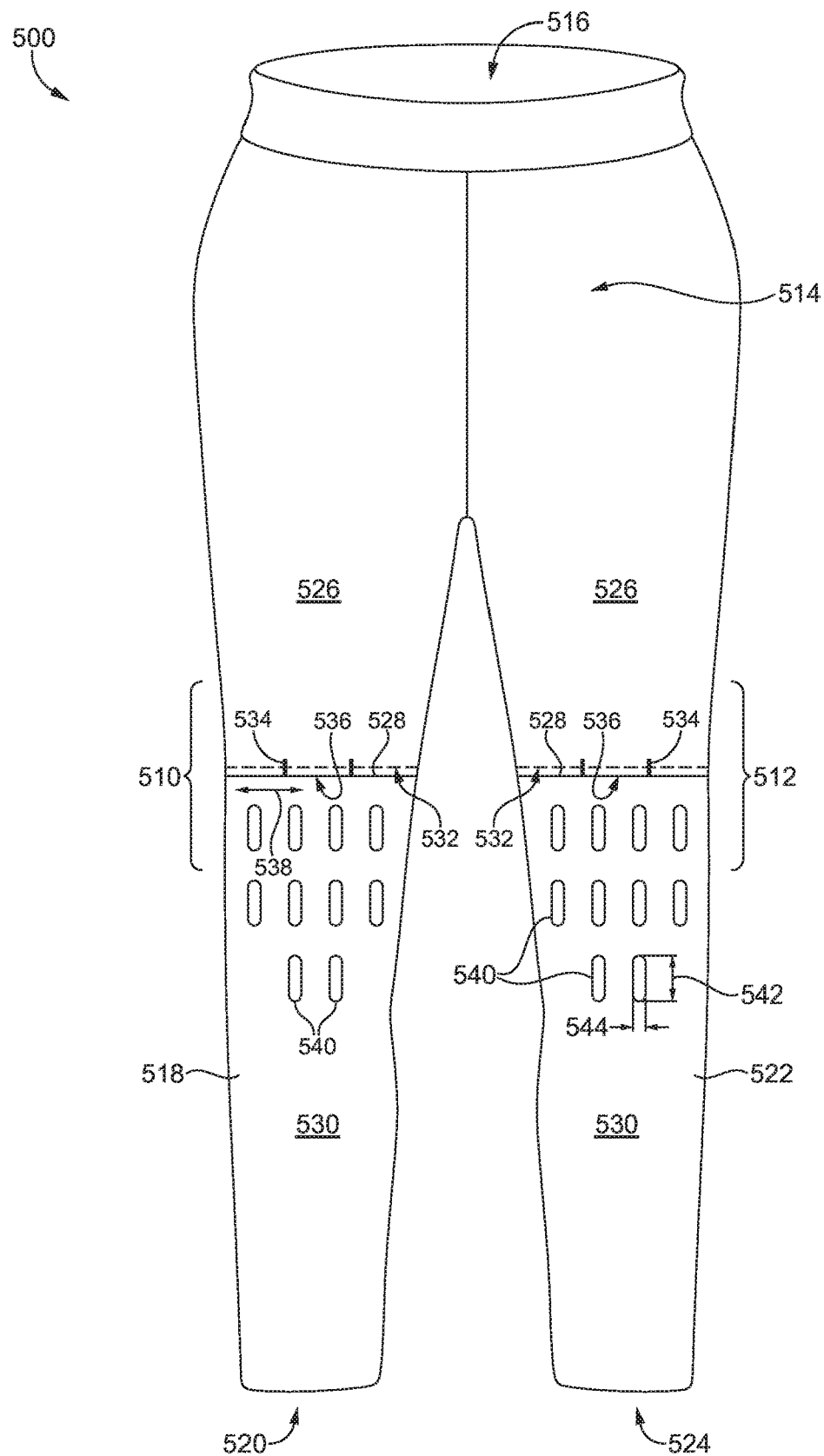
FIG. 5A illustrates a front view of an example lower-body garment having a plurality of discrete overlay film structures and an example vent opening in a closed state before the lower-body garment is exposed to an external stimulus in accordance with aspects herein.
Figure 5B:
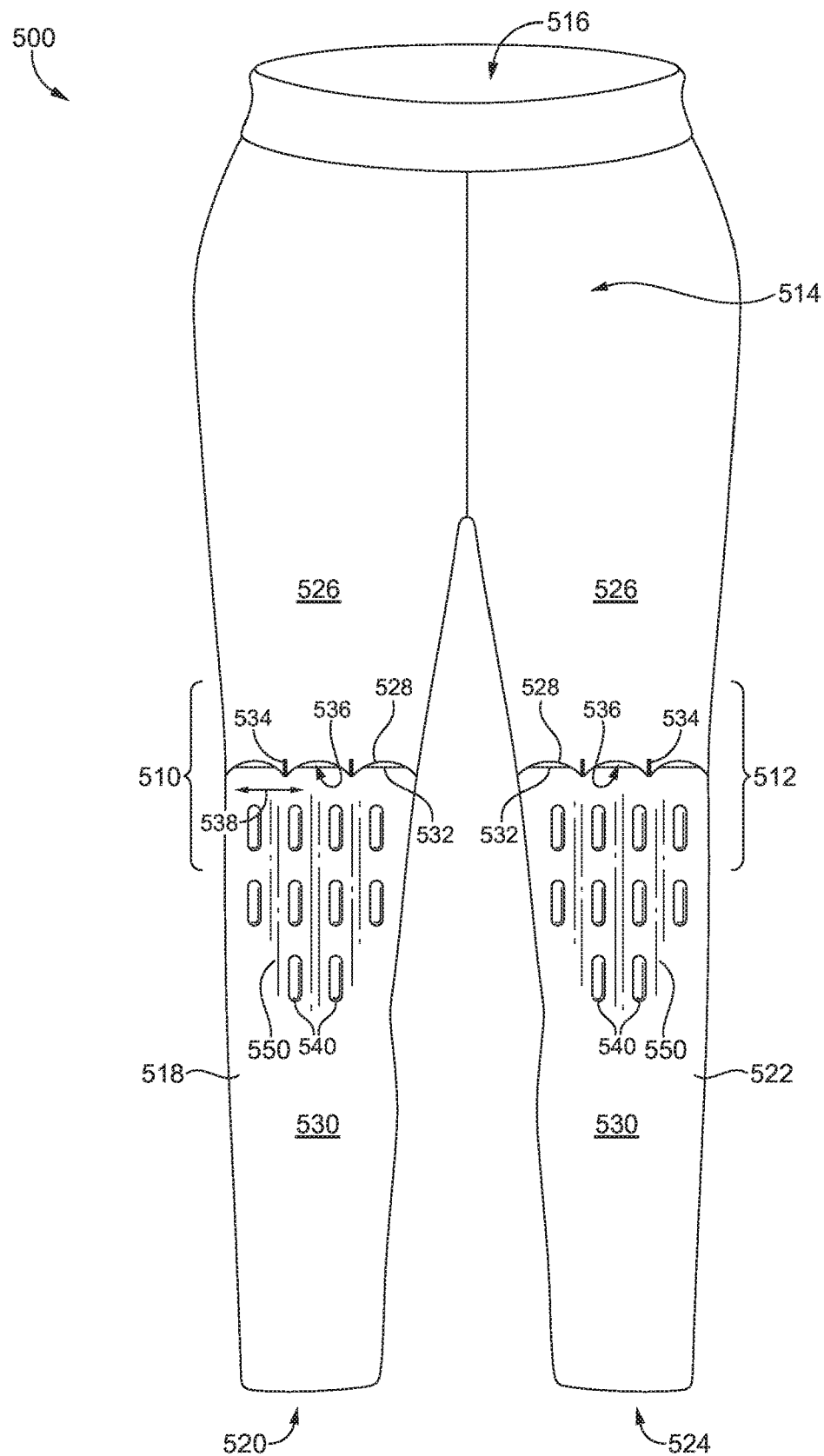
FIG. 5B illustrates a front view of the lower-body garment of FIG. 5A after the lower-body garment is exposed to the external stimulus and the vent opening has transitioned to an open state in accordance with aspects herein.

Aspects herein further contemplate incorporating the vent structures described herein on other articles of apparel such as lower-body garments. FIGS. 5A and 5B depict front views of a lower-body garment 500 having a first vent structure 510 and second vent structure 512. FIG. 5A depicts the lower-body garment 500 before the lower-body garment 500 is exposed to an external stimulus, and FIG. 5B depicts the lower-body garment 500 after being exposed to the external stimulus.

The lower-body garment 500 includes a torso region 514 having a waist opening 516, a first leg portion 518 extending from the torso region 514 and terminating distally in a first leg opening 520, and a second leg portion 522 extending from the torso region 514 and terminating distally in a second leg opening 524. Although shown as a pant, it is contemplated herein that the lower-body garment 500 may be in the form of a short, a tight, a capri, and the like.

The first vent structure 510 and the second vent structure 512 are similarly formed and, as such, a description of how the first vent structure 510 is formed is equally applicable to the second vent structure 512. Referring to FIG. 5A, the first vent structure 510 includes a first panel 526 having a first panel edge 528 and a second panel 530 having a second panel edge 532 (shown in dashed lines to indicate it is generally hidden from view when the vent opening is in a closed state). In example aspects, the first panel edge 528 overlaps the second panel edge 532 and is discontinuously affixed thereto. For instance, the first panel edge 528 is affixed to the second panel edge 532 at a number of spaced-apart securement points such as securement points 534. The first panel edge 528 is not affixed to (or is unaffixed from) the second panel edge 532 at areas between the spaced-apart securement points 534 to form one or more vent openings 536. The longitudinal axis of the vent openings 536 extends in a first direction as indicated by the arrow 538. The location and number of the first and second vent structures 510 and 512 is illustrative only and it is contemplated herein that the vent structures may be located at other areas of the lower-body garment 500 including, for instance, locations on the torso region 514 (e.g., adjacent to the waist opening 516), other locations on the first leg portion 518 and/or second leg portion 522, and/or the back of the lower-body garment 500.

FIG. 5A further depicts a plurality of discrete overlay film structures 540 affixed to the second panel 530 adjacent to (e.g., within about 0 cm to 10 cm) the vent opening(s) 536 and/or the second panel edge 532. As illustrated, the first panel 526 does not include discrete overlay film structures in accordance with aspects herein. The film structures 540 are shown affixed to an outer-facing surface of the second panel 530. In example aspects, the film structures 540 may instead be applied to an inner-facing surface of the second panel 530 in a pattern similar to that shown in FIGS. 5A and 5B so as to be in contact with (or near contact with) a wearer's body surface and any perspiration produced by the wearer. In example aspects, the film structures 540 may be applied to both the outer-facing surface and the inner-facing surface of the second panel 530. Any and all aspects, and any variation thereof, are contemplated as being within aspects herein.

The film structures 540 have a long axis 542 and a short axis 544. The long axes 542 of the film structures 540 are oriented to be substantially perpendicular (i.e., within ±10 degrees of perpendicular) to the longitudinal axis of the vent opening(s) 536 and/or the first direction 538. In example aspects, there is a greater concentration of the film structures 540 closer to the vent opening(s) 536 and/or the second panel edge 532 compared to farther away from the vent opening(s) 536 and/or the second panel edge 532 to facilitate the transition of the vent opening(s) 536 to an open state. The decrease in concentration of the film structures 540 may be due to a decrease in the number of film structures 540. The decrease in concentration may also be due to a decrease in the surface area of the film structures 540. The decrease in concentration may also be due to both a decrease in number and a decrease in the surface area of the film structures 540. Any and all aspects, and any variation thereof, are contemplated as being within aspects herein. The number and shape of the film structures 540 is illustrative only, and it is contemplated herein that other shapes and numbers of film structures 540 may be utilized.

FIG. 5B illustrates the lower-body garment 500 after the garment 500 has been exposed to an external stimulus such as moisture. When the film structures 540 are affixed to an inner-facing surface of the lower-body garment 500, the moisture may be in the form of perspiration produced by a wearer. Exposure of the film structures 540 to the external stimulus causes the film structures 540 to expand, for instance, at least in the z-direction and/or in the x-direction and the y-direction, and to fold or bend at least along their long axes 542. Because each of the long axes 542 are oriented substantially perpendicular to the longitudinal axis of the vent opening(s) 536 and/or the first direction 538, the folding or bending of the film structures 540 along their long axes 542 causes the second panel 530 and the second panel edge 532 to shorten in the first direction 538 based on the lifting or puckering of the second panel 530 caused by the film structures 540 as shown by fold lines 550. Since the first panel 526 does not include film structures, exposure of the lower-body garment 500 to the external stimulus does not cause an appreciable shortening of the first panel 526 or the first panel edge 528 in the first direction 538. The shortening of the second panel 530 and the second panel edge 532 results in the first panel 526 and the first panel edge 528 extending outwardly (e.g., in the positive z-direction) between adjacent securement points 534 which dynamically transitions the vent opening 536 to an open state as shown in FIG. 5B.

It is contemplated herein that the use of overlay film structures to dynamically transition a vent opening from a closed state to an open state and vice versa can be applied to other articles of apparel in addition to those described herein. For example, vent openings may be positioned on an article of headwear, and overlay film structures may be used to transition the vent opening between an open and closed state. Other articles of apparel contemplated herein include, for example, socks, shoes (e.g., uppers), gloves and the like.

Figure 6A:
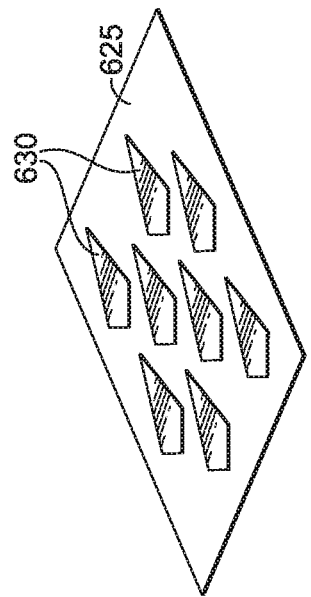
FIGS. 6A-6B illustrate different shape configurations for the overlay film structures in accordance with aspects herein.
Figure 6B:
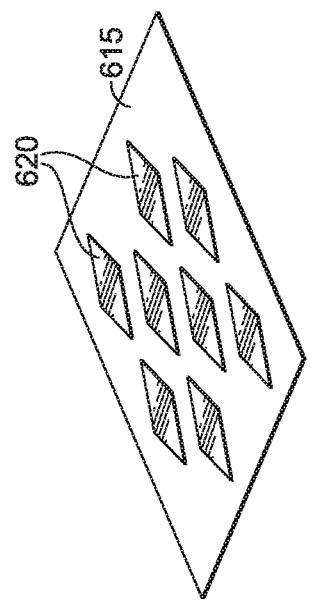

The oval shape depicted for the film structures is just one example of different shape configurations for the film structures. FIGS. 6A-6B depict example alternative shapes for the film structures. FIG. 6A depicts a textile 615 having film structures 620 with a diamond shape. Because a diamond shape has a generally equal length and width, swelling of the film structures 620 would also cause a generally equal decrease in both the width and length of the textile 615. FIG. 6B depicts a textile 625 having film structures 630 with a quadrilateral shape having two pairs of equal length sides that are adjacent to each other. Similar to the oval shape, the film structures 630 have a long axis and a short axis and thus would generally cause an unequal change in dimension of the textile 625 when the textile 625 is exposed to an external stimulus. Additional shapes for the film structures are contemplated herein including asymmetric shapes such as crescents, organic shapes, half-circle shapes, alphanumeric shapes, and the like. As well, it is contemplated herein that the textile may include a number of different shaped film structures and/or film structures with different sizes and/or surface areas. Any and all aspects, and any variation thereof, are contemplated as being within aspects herein.

Figure 7A:
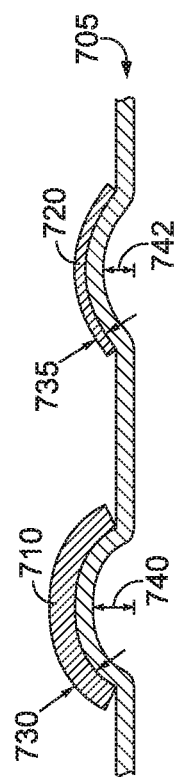
FIG. 7A illustrates a side view of an example textile having overlay film structures with different thicknesses before the textile is exposed to an external stimulus in accordance with aspects herein.
Figure 7B:
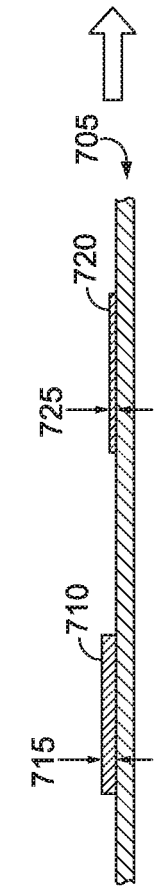
FIG. 7B illustrates a side view of the textile of FIG. 7A after the textile is exposed to the external stimulus in accordance with aspects herein.

The film structures that are applied to article of apparel described herein may have different thicknesses. FIG. 7A depicts a textile 705 before the textile 705 is exposed to an external stimulus, The textile 705 includes a first film structure 710 with a first thickness 715 and a second film structure 720 with a second thickness 725 that is less than the first thickness 715 of the first film structure 710. FIG. 7B illustrates the textile 705 after being exposed to an external stimulus, such as moisture. The first film structure 710 increases in dimension in at least the z-direction to thickness 730, and the second film structure 720 increases in dimension in at least the z-direction to thickness 735, where the thickness 735 is less than the thickness 730. Because the first film structure 710 is thicker than the second film structure 720, it may cause a greater movement of the textile 705 in the z-direction when exposed to the external stimulus as shown by the first film structure 710 having a greater offset 740 than an offset 742 associated with the second film structure 720 after the textile 705 is exposed to the external stimulus.

Figure 8:
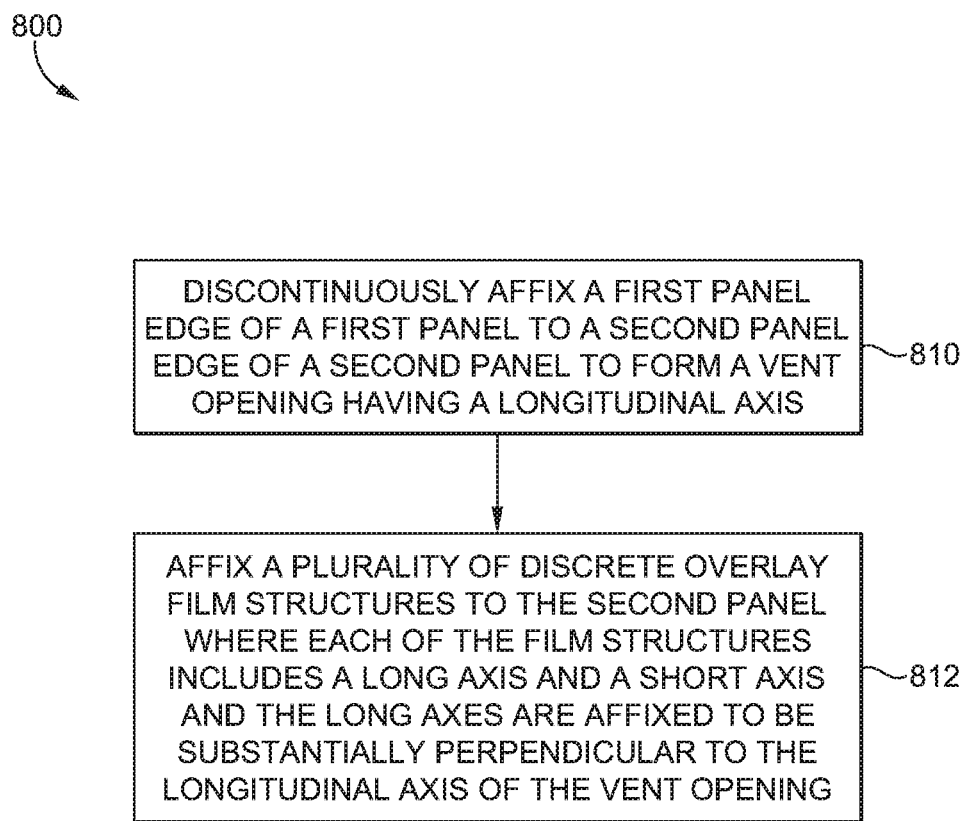
FIG. 8 illustrates a flow diagram of an example method of manufacturing an article of apparel that includes discrete overlay film structures and a vent opening in accordance with aspects herein.

FIG. 8 depicts a flow diagram of an example method 800 of manufacturing an article of apparel having a vent opening, such as the garments 300 and 500. At a step 810, a first panel edge of a first panel of material is discontinuously affixed to a second panel edge of a second panel to form a vent opening on an article of apparel. The vent opening has a longitudinal axis that extends in a first direction.

At a step 812, a plurality of discrete overlay film structures are affixed to the second panel adjacent to at least the second panel edge. In example aspects, the overlay film structures are not affixed to the first panel. Each of the film structures includes a long axis and a short axis, and the long axes of the film structures are affixed to the second panel so as to be substantially perpendicular to the longitudinal axis of the vent opening. When the film structures are exposed to an external stimulus, the film structures expand, for example, in the z-direction which causes the second panel to lift or pucker in areas underlying the film structures. This results in a decrease in dimension of the second panel and the second panel edge in the first direction or in the direction of the longitudinal axis of the vent opening. Because the first panel does not include film structures, the first panel edge does not decrease in dimension resulting in the vent opening transitioning to an open state. The process is reversible, so when the external stimulus is removed, the vent opening transitions back to a closed state.

FIGS. 9A and 9B depict an additional vent structure that may be used in combination with the vent structures described herein or may be used as a stand-alone vent structure. FIG. 9A depicts a textile 900 before the textile 900 is exposed to an external stimulus, such as moisture. The textile 900 may be incorporated into, for example, an upper-body garment such as the upper-body garment 300, a lower-body garment, such as the lower-body garment 500, or other articles of apparel such as headwear, gloves, socks, shoes, and the like. The textile 900 includes a slit 910 formed in the textile 900. The slit 910 may be formed by a mechanical cutting process, laser cutting, water jet cutting, dissolvable yarns, manipulating a knit, non-woven, or weave construction to form the slit 910, and the like. The slit 910 extends from a first surface 901 of the textile 900 to a second opposite surface 902 of the textile 900 to provide a through-passage. The slit 910 includes a first edge 912, a second opposing edge 914, a first end 913, and a second opposing end 915. The longitudinal axis of the slit 910 extends in a first direction between the first end 913 and the second end 915 of the slit 910. Although the first edge 912 is shown abutting the second edge 914, it is contemplated herein that a small space may exist between the first and second edges 912 and 914 such that the first and second edges 912 and 914 are not in direct contact with each other. Although the slit 910 is shown as linear, it is contemplated herein that the slit 910 may have other shapes including curved shapes, geometric shapes, curvilinear shapes, alphanumeric shapes, and the like.

The textile 900 further includes a first plurality of discrete overlay film structures 916 positioned adjacent to the first edge 912 of the slit 910, and a second plurality of discrete overlay film structures 918 positioned adjacent to the second edge 914 of the slit 910. Each of the first plurality of film structures 916 and the second plurality of film structures 918 is shaped to have a long axis, such as long axis 924 and a short axis, such as short axis 926. In example aspects, the long axis 924 of each of the first and second pluralities of film structures 916 and 918 is oriented to be substantially perpendicular to the longitudinal axis of the slit 910.

It is contemplated herein that the number of film structures 916 and/or 918 may decrease the farther away from the slit 910. It is also contemplated herein that the size and/or surface area of the film structures 916 and/or 918 may decrease the farther away from the slit 910. Additionally, both the number and surface area of the film structures 916 and/or 918 may decrease the farther away from the slit 910.

FIG. 9B depicts the textile 900 after being exposed to an external stimulus, such as water or moisture. Exposure to the external stimulus causes the first plurality of film structures 916 and the second plurality of film structures 918 to expand, for instance, at least in the z-direction and/or in the x-direction and/or the y-direction, and to fold or bend at least along their long axes 924. Because each of the long axes 924 is oriented substantially perpendicular to the longitudinal axis of the slit 910, the folding or bending of the film structures 916 and 918 along their long axes 924 causes the first edge 912 and the second edge 914 to shorten in the direction of the longitudinal axis, or in the first direction, based on the lifting or puckering of the textile 900 caused by the film structures 916 and 918 as shown by fold lines 920 and 922 in FIG. 9B. The shortening of the first edge 912 and the second edge 914 may cause the first edge 912 and the second edge 914 to extend in the z-direction away from the surface plane of the textile 900 thereby transitioning the slit 910 from a closed state to an open state having a vent opening 925. Once the external stimulus is removed, the textile 900 transitions back to its pre-exposure state and the slit 910 transitions to a closed state.

Figure 10A:
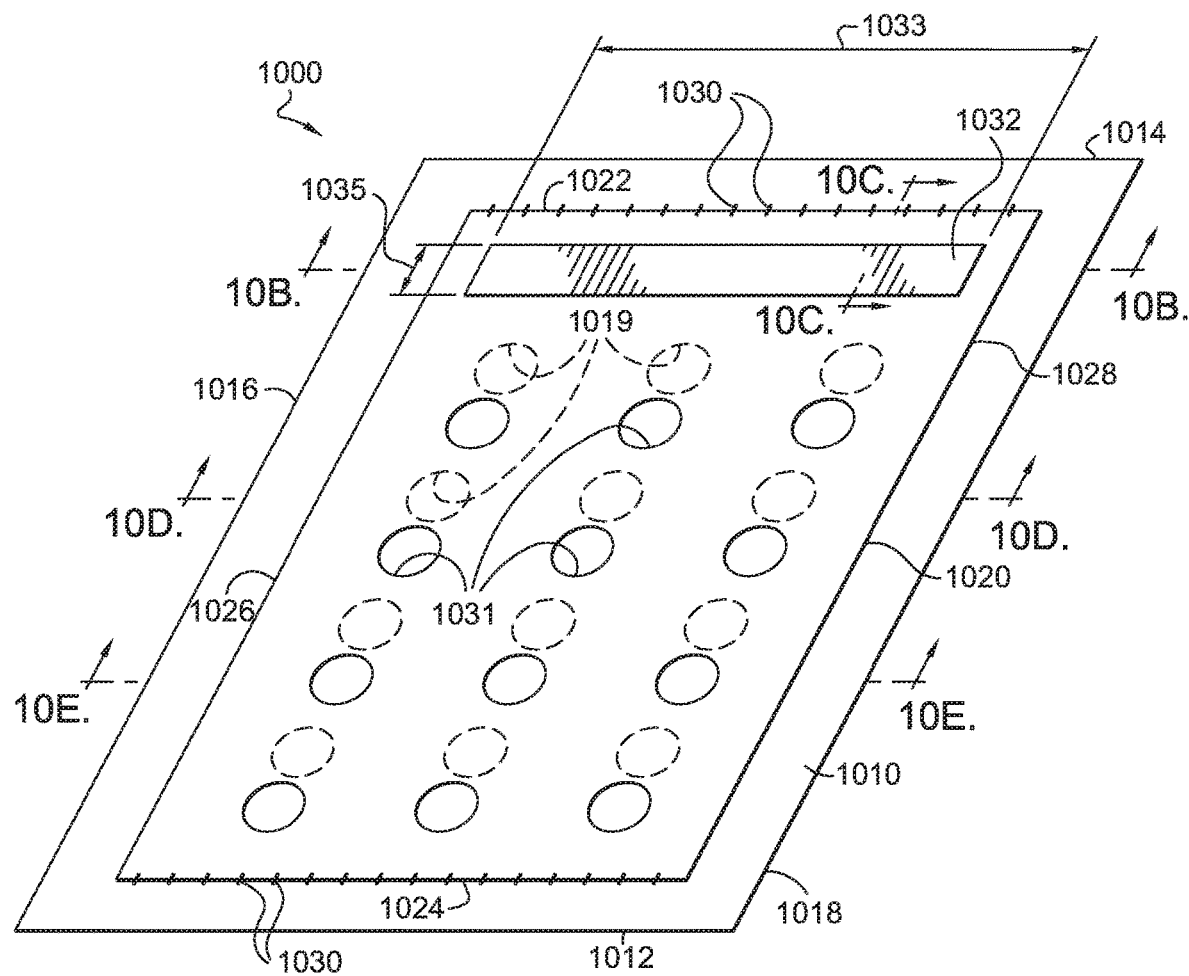
FIG. 10A illustrates a textile construction before being exposed to an external stimulus, where the textile construction includes a first panel of material having a first plurality of apertures and a second panel of material having a second plurality apertures that are offset from the first plurality of apertures in accordance with aspects herein.

FIGS. 10A-10I depict yet another example vent structure that may be used in combination with the vent structures described herein or may be used as a stand-alone vent structure. FIG. 10A depicts a textile construction 1000 before the textile construction 1000 is exposed to an external stimulus, such as moisture or perspiration. The textile construction 1000 may be incorporated into, for example, an upper-body garment such as the upper-body garment 300, a lower-body garment, such as the lower-body garment 500, or other articles of apparel such as headwear, gloves, socks, shoes, and the like.

The textile construction 1000 includes a first panel of material 1010 having a first edge 1012, a second edge 1014 opposite the first edge 1012, a third edge 1016, and a fourth edge 1018 opposite the third edge 1016. The depiction of the edges 1012, 1014, 1016, and 1018 is illustrative only, and it is contemplated herein that the first panel of material 1010 may comprise additional edges or less edges, may comprise non-linear edges (e.g., curved edges), and that the edges may form, for instance, portions of an article of apparel (e.g., a hood edge, a waistband edge, a front opening edge, and like). In example aspects, when the textile construction 1000 is incorporated into an upper-body garment or a lower-body garment, the first panel of material 1010 may form an outer-facing layer of the garment. The first panel of material 1010 includes a first plurality of apertures 1019 that extend through the thickness of the first panel of material 1010. The first plurality of apertures 1019 are shown in dashed lines in FIG. 10A to indicate they are generally hidden from view by a second panel of material discussed below. The number, shape, and size of the first plurality of apertures 1019 is illustrative only, and it is contemplated herein that the first plurality of apertures 1019 may include different shaped apertures, different sizes of apertures, and different numbers of apertures. Any and all aspects, and any variation thereof, are contemplated as being within aspects herein.

The textile construction 1000 further includes a second panel of material 1020 that is in face-sharing contact with the first panel of material 1010. In example aspects, when the textile construction 1000 is incorporated into an upper-body garment or a lower-body garment, the second panel of material 1020 forms an inner-facing layer of the garment. In example aspects, the second panel of material 1020 may be secured at one or more of its edges to the first panel of material 1010. For instance, a first edge 1022 of the second panel of material 1020 may be secured to the first panel of material 1010 as indicated by securement points 1030. It is also contemplated that a second opposite edge 1024 of the second panel of material 1020 may be secured to the first panel of material 1010 as indicated by the securement points 1030. It is also contemplated herein that both the first edge 1022 and the second edge 1024 may be secured to the first panel of material 1010. The securement points 1030 may include affixation technologies such as stitching, gluing, adhesives, spot welding, bonding, seam tape, and the like. One or more additional edges of the second panel of material 1020 may be unaffixed from the first panel of material 1010 such as a third edge 1026 and/or a fourth opposite edge 1028 of the second panel of material 1020. The depiction of the edges 1022, 1024, 1026, and 1028 is illustrative only, and it is contemplated herein that the second panel of material 1020 may comprise additional edges or less edges, may comprise non-linear edges (e.g., curved edges), and that the edges may form, for instance, portions of an article of apparel (e.g., a hood edge, a waistband edge, a front opening edge, and like).

In example aspects, the surfaces of the first panel of material 1010 and the second panel of material 1020 that are in face-sharing contact with each other are not affixed to each other such that a space is present between the respective surfaces of the first panel of material 1010 and the second panel of material 1020. As explained further below, this enables the surface of the second panel of material 1020 to shift relative to the surface of the first panel of material 1010. It is further contemplated herein, that in some example aspects, the length of the second panel of material 1020 as measured between the first edge 1022 and the second edge 1024 before the second panel of material 1020 is affixed to the first panel of material 1010 may be greater than the distance between the securement points 1030 at the first end and the second end of the textile construction 1000. This creates a greater volume for the second panel of material 1020 than, for example, if the length of the second panel of material 1020 was the same as the distance between the securement points 1030. The excess material may facilitate the shifting of the second panel of material 1020 relative to the first panel of material 1010.

The second panel of material 1020 includes a second plurality of apertures 1031 that extend through the thickness of the second panel of material 1020. In example aspects, the second plurality of apertures 1031 may have a similar number, size and shape as the first plurality of apertures 1019. As shown in FIG. 10A, when the textile construction 1000 is in a closed state, the first plurality of apertures 1019 are offset in a direction parallel to the planar surface of the textile construction 1000, or at least partially offset, from the second plurality of apertures 1031 such that there is not an open communication path between a first surface of the textile construction 1000 and a second opposite surface of the textile construction 1000. To describe this further, when the textile construction 1000 is in the closed state, the second plurality of apertures 1031 are offset distally from the first plurality of apertures 1019 with respect to the first edge 1022 of the second panel of material 1020 and are offset in a direction substantially perpendicular to the first edge 1022 of the second panel of material 1020.

The textile construction 1000 further includes an overlay film structure 1032 that is affixed to the second panel of material 1020 adjacent to the first edge 1022 of the second panel of material. Although only one overlay film structure is shown, it is contemplated herein that the textile construction 1000 may include multiple overlay film structures having the orientation shown in FIG. 10A. The overlay film structure 1032 has a long axis 1033 and a short axis 1035, where the long axis 1033 extends across the width of the second panel of material 1020. Although the overlay film structure 1032 is described as extending across the width of the second panel of material 1020, it is more generally contemplated herein that the long axis 1033 of the overlay film structure 1032 may be positioned adjacent to and parallel with an affixed edge of the second panel of material 1020.

Figure 10B:
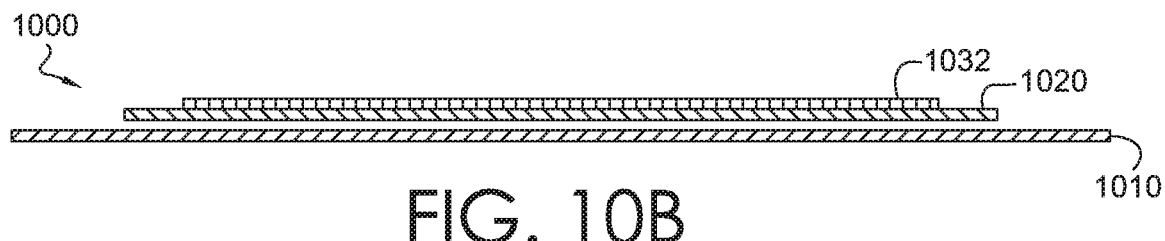
FIG. 10B illustrates a cross-section taken along cut line 10B-10B of FIG. 10A in accordance with aspects herein.

FIG. 10B depicts a cross-section taken along cut line 10B-10B of FIG. 10A. As shown, the second panel of material 1020 is positioned adjacent to the first panel of material 1010 such that their respective surfaces are in near contact. The surfaces of the respective panels of material 1010 and 1020 are not affixed to each other, and a space is formed between the surfaces as shown. The overlay film structure 1032 is depicted as affixed to the surface of the second panel of material 1020 that is opposite the surface that is in face-sharing contact with the first panel of material 1010. Because the textile construction has not been exposed to an external stimulus, the overlay film structure 1032 and the second panel of material 1020 are in a generally planar relationship with the first panel of material 1010.

Figure 10C:
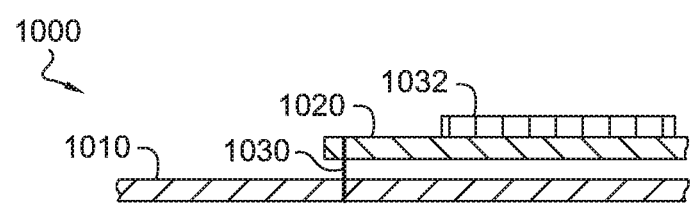
FIG. 10C illustrates a cross-section taken along cut line 10C-10C of FIG. 10A in accordance with aspects herein.

FIG. 10C depicts a cross-section taken along cut line 10C-10C of FIG. 10A. FIG. 10C depicts the securement point 1030 that represents the point of affixation between the first edge 1022 of the second panel of material 1020 and the first panel of material 1010. Again, because the textile construction 1000 has not been exposed to an external stimulus, the overlay film structure 1032 and the second panel of material 1020 are in a generally planar relationship with the first panel of material 1010.

Figure 10D:
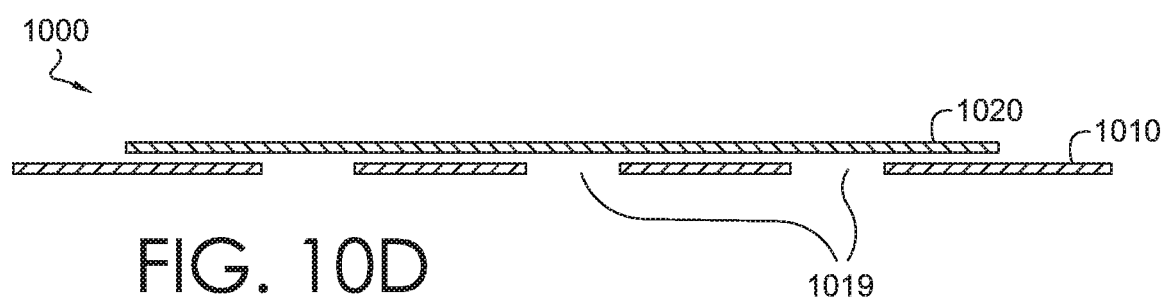
FIG. 10D illustrates a cross-section taken along cut line 10D-10D of FIG. 10A in accordance with aspects herein.

FIG. 10D depicts a cross-section taken along cut line 10D-10D of FIG. 10A. FIG. 10D illustrates the first plurality of apertures 1019 formed through the thickness of the first panel of material 1010. Because the first plurality of apertures 1019 are offset from the second plurality of apertures 1031 when the textile construction 1000 in in a closed state, the second panel of material 1020 is shown as a continuous panel that occludes or blocks the first plurality of apertures 1019 minimizing the movement of, for instance, air through the textile construction 1000.

Figure 10E:
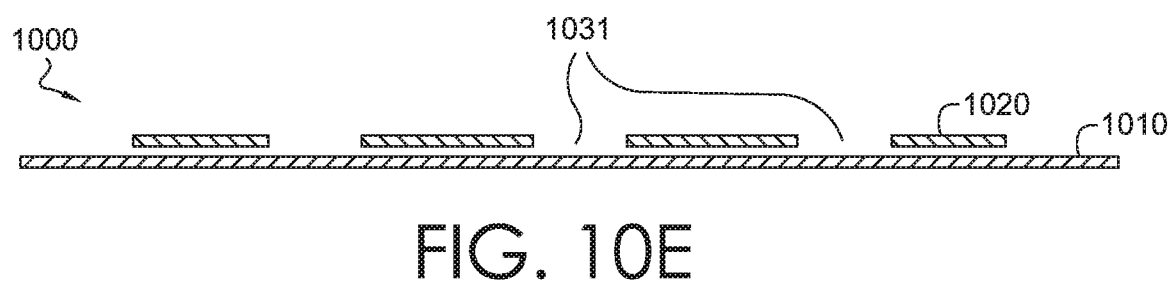
FIG. 10E illustrates a cross-section taken along cut line 10E-10E of FIG. 10A in accordance with aspects herein.

FIG. 10E depicts a cross-section taken along cut line 10E-10E of FIG. 10A. FIG. 10E illustrates the second plurality of apertures 1031 formed through the thickness of the second panel of material 1020. Similar to FIG. 10D, because the second plurality of apertures 1031 are offset from the first plurality of apertures 1019 when the textile construction 1000 is in the closed state, the first panel of material 1010 is shown as a continuous panel that occludes or blocks the second plurality of apertures 1031 minimizing the movement of, for instance, air through the textile construction 1000.

Figure 10F:
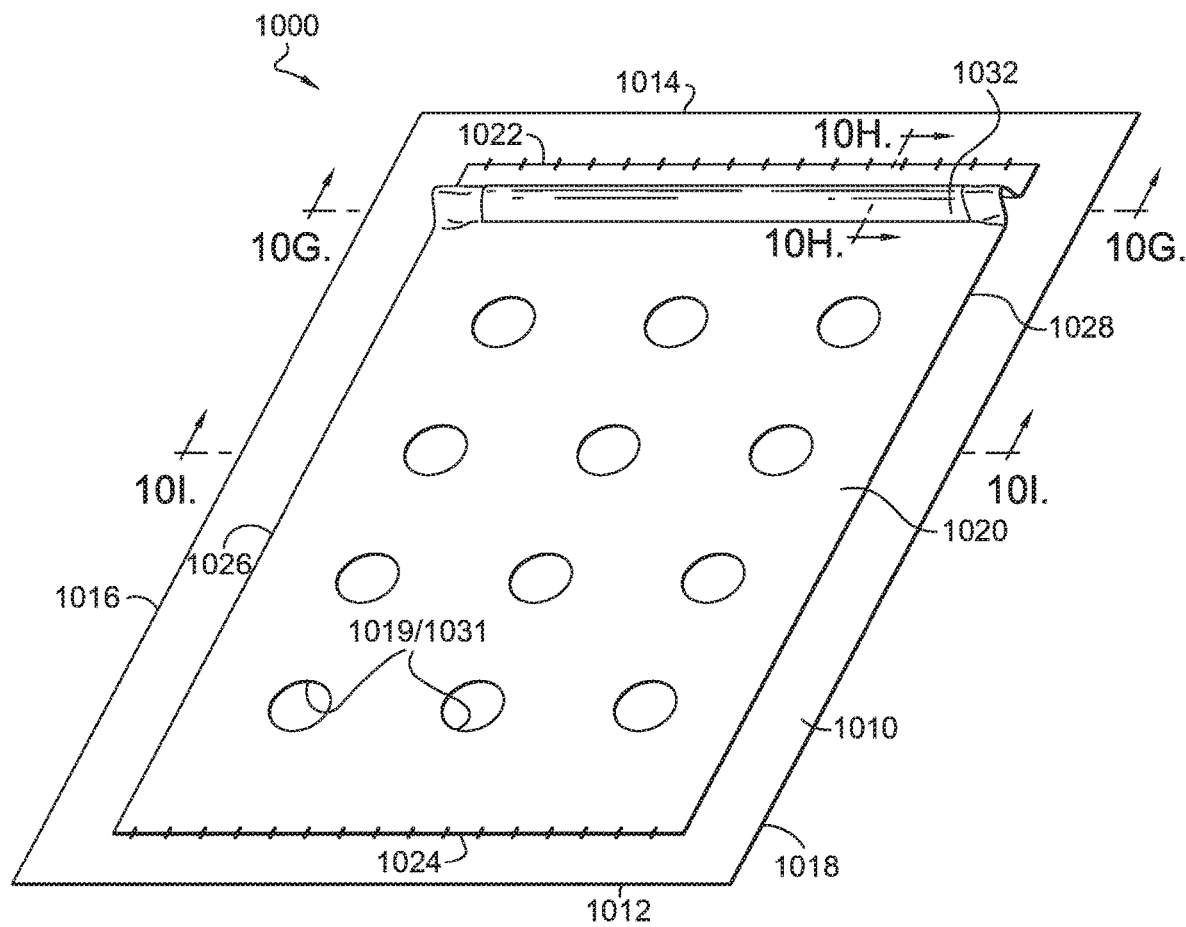
FIG. 10F illustrates the textile construction of FIG. 10A after being exposed to an external stimulus, where the first plurality of apertures of the first panel are at least partially aligned with the second plurality apertures of the second panel in accordance with aspects herein.

FIG. 10F depicts the textile construction 1000 after being exposed to an external stimulus such as moisture or perspiration. Similar to what has been previously described, when the textile construction 1000 is exposed to, for example, moisture the overlay film structure 1032 increases in dimension in at least the z-direction and/or the x-direction, and/or the y-direction. The subsequent folding of the overlay film structure 1032 along its long axis 1033 causes the second panel of material 1020 to also fold in a direction at least parallel to the long axis 1033 of the overlay film structure 1032 in areas of the second panel of material 1020 that underlie the overlay film structure 1032 as shown in FIG. 10F. The folding of the second panel of material 1020 causes movement of the second panel of material 1020 in a direction toward the first edge 1022 of the second panel of material 1020 (i.e., movement in the lengthwise direction of the second panel of material 1020). Stated differently, the folding of the second panel of material 1020 causes movement of the second panel of material 1020 in a direction substantially perpendicular to the long axis 1033 of the overlay film structure 1032. The shifting of the second panel of material 1020 relative to the first panel of material 1010 in a direction substantially perpendicular to the long axis 1033 of the overlay film structure 1032 aligns, or at least partially aligns the second plurality of apertures 1031 with the first plurality of apertures 1019 to transition the textile construction 1000 to an open state thereby enabling the movement of air and/or moisture vapor through the aligned apertures 1019 and 1031.

The shifting of the second panel of material 1020 relative to the first panel of material 1010 is facilitated by affixing the first edge 1022 of the second panel of material 1020 to the first panel of material 1010. The securement points 1030 act as an anchor fixing the first edge 1022 of the second panel of material 1020 and allowing the remaining portions of the second panel of material 1020 to shift or move. The shifting of the second panel of material 1020 relative to the first panel of material 1010 may also be facilitated by forming the second panel of material 1020 to have an excess volume as described above.

Figure 10G:
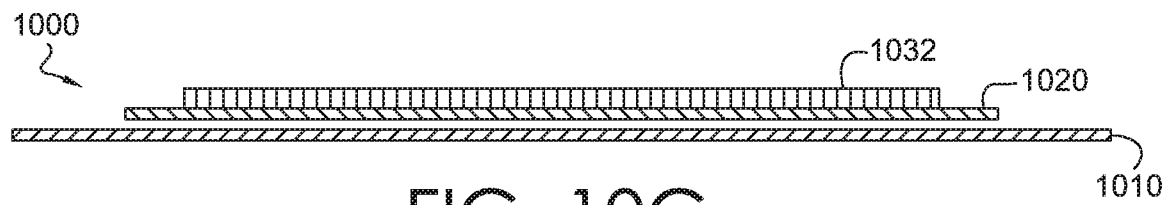
FIG. 10G illustrates a cross-section taken along cut line 10G-10G of FIG. 10F in accordance with aspects herein.
Figure 10H:
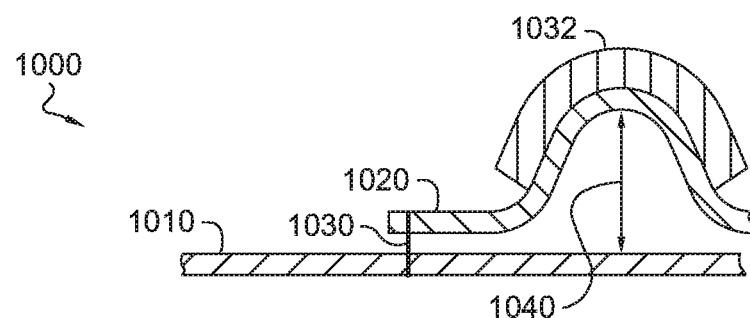
FIG. 10H illustrates a cross-section taken along cut line 10H-10H of FIG. 10F in accordance with aspects herein.

FIG. 10G depicts a cross-section taken along cut line 10G-10G of FIG. 10F. As indicated, the overlay film structure 1032 has increased in thickness in response to the external stimulus. Although not shown, it is contemplated that there may be a slight folding of the overlay film structure 1032 and the underlying second panel of material 1020 along the short axis 1035 of the overlay film structure 1032. FIG. 10H depicts a cross-section taken along cut line 10H-10H of FIG. 10H and illustrates the folding of the overlay film structure 1032 and the second panel of material 1020 along and parallel to the long axis 1033 of the overlay film structure 1032 to create an offset 1040 with respect to the first panel of material 1010. Stated differently, in response to the external stimulus, the second panel of material 1020 and the overlay film structure 1032 extend in a z-direction away from the first panel of material 1010. This, in turn, causes movement of the remaining portions of the second panel of material 1020 in a direction substantially perpendicular to the long axis 1033 of the overlay film structure 1032.

Figure 10I:
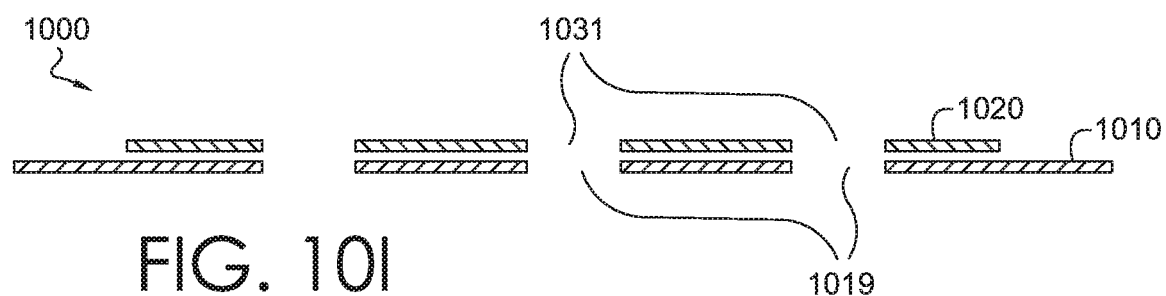
FIG. 10I illustrates a cross-section taken along cut line 10I-10I of FIG. 10F in accordance with aspects herein.

FIG. 10I depicts a cross-section taken along cut line 10I-10I of FIG. 10F. As shown, the shifting the second panel of material 1020 relative to the first panel of material 1010 causes the second plurality of apertures 1031 to align with, or at least partially align with, the first plurality of apertures 1019. The aligned apertures 1019 and 1031 facilitate the movement of air and/or moisture vapor through the textile construction 1000.

As set forth, the textile construction 1000 may be incorporated into various articles of apparel. As an illustrative example, when the textile construction 1000 is incorporated into an upper-body garment, the textile construction 1000 may be positioned in areas generating large amounts of heat and/or moisture vapor such as, for example, the back area of a wearer. The perspiration produced by the wearer during exercise may induce the dimensional change in the overlay film structure 1032 and cause the second panel of material 1020 to shift relative to the first panel of material 1010 and align the second plurality of apertures 1031 with the first plurality of apertures 1019.

It is further contemplated herein that the first and second plurality of apertures 1019 and 1031 may be configured to initially align with each other before the textile construction 1000 is exposed to an external stimulus. In this example, the second panel of material 1020 may be an outer-facing layer of, for instance, a garment such that the overlay film structure 1032 is positioned on an external-facing surface of the garment. When the textile construction 1000 exposed to an external stimulus, such as precipitation or snow, the increase in dimension of the overlay film structure 1032 may cause the second panel of material 1020 to shift relative to the first panel of material 1010 resulting in the second plurality of apertures 1031 becoming offset relative to the first plurality of apertures 1019 thereby preventing precipitation from entering into the garment. Any and all aspects, and any variation thereof, are contemplated as being within the scope herein.

Aspects of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

What is claimed is:

1. An article of apparel comprising:
   a first panel having a first panel edge;
      a second panel having a second panel edge, wherein the first panel edge is discontinuously affixed to the second panel edge to form a vent opening having a longitudinal axis; and
      an overlay film structure affixed to a portion of the second panel, the overlay film structure comprising a polymer film of thermoplastic material configured to diffuse moisture from a first surface of the overlay film structure to an opposite second surface of the overlay film structure;
      wherein upon exposure to moisture the overlay film structure undergoes an increase in dimension in at least one direction to cause the vent opening to transition from a closed state to an open state.

2. The article of apparel of claim 1, wherein the overlay film structure is affixed to an inner-facing surface of the second panel.

3. The article of apparel of claim 1, wherein the longitudinal axis of the vent opening extends in a first direction, and wherein when the overlay film structure is exposed to moisture, the second panel undergoes a decrease in dimension in the first direction.

4. The article of apparel of claim 1, wherein the overlay film structure has a thickness equal to or less than 100 microns.

5. The article of apparel of claim 1, wherein the article of apparel is an upper-body garment.

6. The article of apparel of claim 5, wherein the first panel and the second panel are on a back portion of the upper body garment.

7. The article of apparel of claim 6, wherein the overlay film structure has a long axis and a short axis, and the overlay film structure is oriented so that its long axis is oriented substantially perpendicular to the longitudinal axis of the vent opening.

8. The article of apparel of claim 6, wherein the first panel edge overlaps the second panel edge, and the first panel edge is discontinuously affixed to the second panel edge by one or more securement points.

9. The article of apparel of claim 1, wherein the polymer film comprises a thermoplastic polyester elastomer.

10. A textile comprising:
    a slit extending from a first surface of the textile to a second opposite surface of the textile, the slit comprising a first edge, an opposing second edge, a first end, a second end, and a longitudinal axis extending between the first end and the second end;

a first overlay film structure applied to the first surface and positioned adjacent to the first edge of the slit; and a second overlay film structure applied to the first surface and positioned adjacent to the second edge of the slit;

wherein when the textile is exposed to an external stimulus, the first overlay film structure and the second overlay film structure undergo an increase in dimension in at least one direction to cause the slit to transition from a closed state to an open state with the first edge and the second edge of the slit extending in a first direction away from a surface plane of the textile.

11. The textile of claim 10, wherein each of the first overlay film structure and the second overlay film structure include a long axis and a short axis, and wherein the long axis of the first overlay film structure and the second overlay film structure are oriented substantially perpendicular to the longitudinal axis of the slit.

12. The textile of claim 10, wherein the first overlay film structure and the second overlay film structure comprise a thermoplastic material.

13. The textile of claim 10, wherein the longitudinal axis of the slit extends in a second direction, and wherein when the first overlay film structure and the second overlay film structure are exposed to the external stimulus, the first edge and the second edge of the slit undergo a decrease in dimension in the second direction.

14. A textile construction comprising:

a first panel of material having a first aperture extending therethrough;

a second panel of material positioned adjacent to the first panel of material, the second panel of material having a second aperture extending therethrough, wherein the first aperture is at least partially offset from the second aperture when the textile construction is in a closed state; and an overlay film structure affixed to and extending across a width of a first end of the second panel of material, wherein when the textile construction is exposed to moisture, the overlay film structure undergoes an increase in dimension in at least a z-direction to cause the second panel of material to shift in a lengthwise direction which at least partially aligns the second aperture with the first aperture to transition the textile construction to an open state.

15. The textile construction of claim 14, wherein the first end of the second panel of material includes a first edge that is affixed to the first panel of material.

16. The textile construction of claim 15, wherein a first set of additional edges of the second panel of material are affixed to the first panel of material.

17. The textile construction of claim 16, wherein a second set of additional edges of the second panel of material are unaffixed from the first panel of material.

18. The textile of claim 14, wherein the overlay film structure is a thermoplastic material.

* * * * *

UNITED STATES PATENT AND TRADEMARK OFFICE
CERTIFICATE OF CORRECTION

| | | |
|---|---|---|
| PATENT NO. | : 12,053,041 B2 | Page 1 of 1 |
| APPLICATION NO. | : 18/100362 | |
| DATED | : August 6, 2024 | |
| INVENTOR(S) | : Iustinia Koshkaroff et al. | |

It is certified that error appears in the above-identified patent and that said Letters Patent is hereby corrected as shown below:

In the Specification

Column 18, Line 28:
"external stimulus, The textile 705 includes a first film" should read --external stimulus. The textile 705 includes a first film--.

Column 22, Line 23:
"1031 when the textile construction 1000 in in a closed state," should read --1031 when the textile construction 1000 in a closed state,--.

Column 24, Line 15:
"various figures need be carried out in the specific order" should read --various figures need to be carried out in the specific order--.

In the Claims

Column 26, Line 26, Claim 18:
"18. The textile of claim 14, wherein the overlay film" should read --18. The textile construction of claim 14, wherein the overlay film--.

Signed and Sealed this
Twenty-fifth Day of February, 2025

Coke Morgan Stewart
*Acting Director of the United States Patent and Trademark Office*